(12) United States Patent
Suman et al.

(10) Patent No.: US 10,915,719 B2
(45) Date of Patent: Feb. 9, 2021

(54) INDICIA CAPTURE WITH ANGLED FOV IN DIRECT PART MARKING

(71) Applicant: Datalogic IP Tech S.R.L., Lippo di Calderara di reno (IT)

(72) Inventors: Michele Suman, Ponte San Nicolo (IT); Paolo Quattrini, Sala Bolognese (IT)

(73) Assignee: Datalogic IP Tech S.R.L, Bologna (IT)

( * ) Notice: Subject to any disclaimer, the term of this patent is extended or adjusted under 35 U.S.C. 154(b) by 126 days.

(21) Appl. No.: 16/291,096

(22) Filed: Mar. 4, 2019

(65) Prior Publication Data
US 2020/0285823 A1    Sep. 10, 2020

(51) Int. Cl.
*G06K 7/10*       (2006.01)
*G06K 7/14*       (2006.01)

(52) U.S. Cl.
CPC ..... *G06K 7/10722* (2013.01); *G06K 7/10831* (2013.01); *G06K 7/10881* (2013.01); *G06K 7/1413* (2013.01); *G06K 7/1417* (2013.01)

(58) Field of Classification Search
CPC ................ G06K 7/10831; G06K 7/10881
USPC .................................................. 235/462.11
See application file for complete search history.

(56) References Cited

U.S. PATENT DOCUMENTS

| | | | |
|---|---|---|---|
| 4,963,756 A | | 10/1990 | Quan et al. |
| 6,036,095 A | * | 3/2000 | Seo .................... G06K 7/10584 |
| | | | 235/454 |
| 7,264,168 B2 | | 9/2007 | He et al. |
| 9,082,034 B2 | | 7/2015 | Lei et al. |
| 9,367,725 B2 | | 6/2016 | Negro et al. |
| 9,792,477 B1 | | 10/2017 | He et al. |
| 10,628,646 B1 | * | 4/2020 | Lozano ............. G06K 7/10881 |
| 2011/0317150 A1 | * | 12/2011 | Decoux ................. G07D 7/121 |
| | | | 356/73 |
| 2017/0140187 A1 | | 5/2017 | Izaki et al. |
| 2018/0181783 A1 | | 6/2018 | Feng et al. |

FOREIGN PATENT DOCUMENTS

WO     2009107570 A1    9/2009

OTHER PUBLICATIONS

ISR and Written Opinion, PCT/EP2020/055509, dated May 4, 2020 (16 pages).

* cited by examiner

*Primary Examiner* — Toan C Ly
(74) *Attorney, Agent, or Firm* — The Juhasz Law Firm

(57) ABSTRACT

A scanning device includes: a housing portion defining a scanner head axis and a nose end; an image sensor to capture an indicia; an optics component between the image sensor and the nose end to cooperate with the image sensor to define a scanning device FOV extending along a scanning device optical axis through the nose end and toward an object surface, and to convey light reflected from the object surface within the scanning device FOV to the image sensor; and a light source to illuminate the object surface, wherein the scanning device optical axis is tilted relative to the scanner head axis to cause the scanning device FOV to extend along the scanning device optical axis in a direction tilted away from in parallel with the scanner head axis to prevent including a direct reflection of the light source from the object surface in the scanning device FOV.

25 Claims, 20 Drawing Sheets

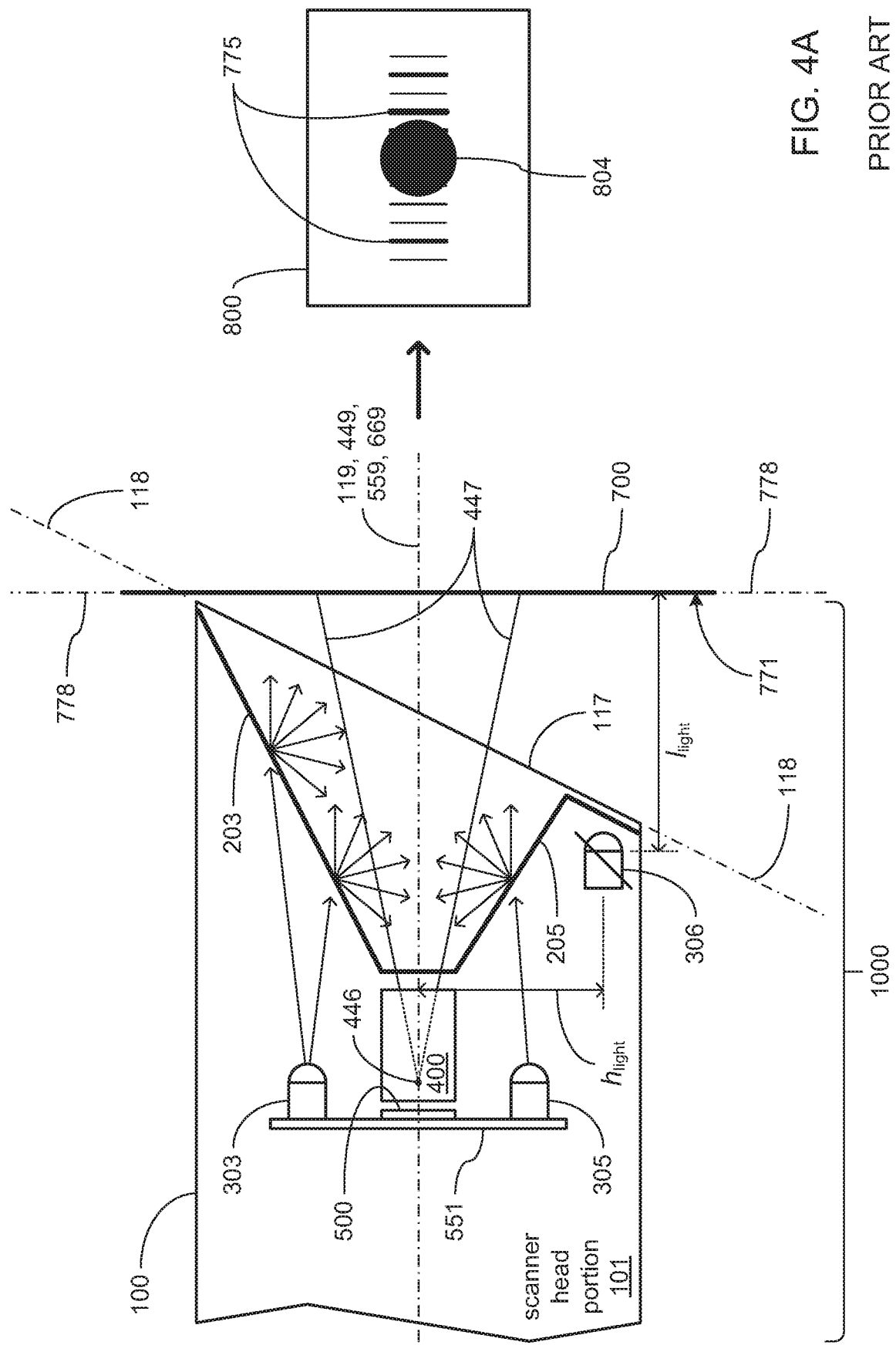

INDICIA CAPTURE WITH ANGLED FOV IN DIRECT PART MARKING

BACKGROUND OF THE INVENTION

1. Field of the Invention

The present invention relates to devices for optically capturing indicia that encodes data where such indicia are carried directly on the surfaces of objects.

2. Description of the Related Art

The use of encoded indicia applied to surfaces of objects that encode data concerning those objects for subsequent capture and decoding, such as barcodes and/or QR codes, is well known. Such indicia have long been in use for purposes as varied as tracking the fabrication of a product on an assembly line, to tracking the sale of a product at a checkout counter of a retail store, to tracking the progress of the shipment of a package.

It has long been commonplace for such encoded indicia to be implemented as a marking using a single color that is selected to contrast sharply with the color of the surface to which it is applied. A well known example of this is a barcode printed in black ink onto a surface of a white label or white piece of paper that is affixed to the surface of an object about which the barcode encodes data. As those skilled in the art will readily recognize, the relatively high contrast of the black ink of the encoded indicia on a white sticker or white paper surface provides a highly favorable set of circumstances for the optical capture of the barcode, thereby increasing the likelihood of a successful decode thereof.

However, more recently, it has been deemed desirable to be apply such encoded indicia directly to the surfaces of the objects, themselves, thereby doing away with the use of such stickers or pieces of paper. This includes situations in which an object may be of a shape or size that is in some way not amenable to having a sticker or piece of paper affixed thereto that would be large enough to carry an encoded indicia. This also includes situations where the surface of an object has been given a finish or other surface treatment that may greatly reduce the effectiveness of adhesives that may be used to affix a sticker or piece of paper carrying an encoded indicia thereto, or where the surface of an object may be damaged if such a sticker or piece of paper were affixed to it with an adhesive.

Regardless of the motivation for applying markings directly to the surface of that object, including encoded indicia, the act of doing so is commonly referred to as direct part marking (DPM). DPM may be performed using any of a variety of techniques, including and not limited to, laser etching, mechanical engraving, and ink-based printing. Unfortunately, many of these techniques may generate markings of a color that provides a relatively low contrast against the color of adjacent unmarked portions of the surface of an object. Alternatively or additionally, where the object is of a type that may be fabricated to have any of a wide variety of colors (e.g., by choice of the color of the material from which it is made or by choice of the color of the paint or anodizing dye that is applied to it), different ones of the object of different colors may create widely varying degrees of contrast between the markings and adjacent unmarked surface portions.

Where a printing technique is used to generate markings, it may be possible to select a printing color that enhances the contrast with adjacent unmarked surface portions. However, where an engraving or etching technique is used, there may be little or no ability to select or otherwise control the color of a marking, since the resulting color of the marking may be only subtly different from the color of adjacent unmarked surface portions (e.g., two subtly different shades color). Thus, it may be that other techniques to provide improved contrast may be required. One such other technique is to increase the amount of light that is used to illuminate at least the portion of the surface of the object that carries the marking. However, as will also be familiar to those skilled in the art, various difficulties can arise in efforts to provide such increased lighting.

As will be familiar to those skilled in the art, the provision of relatively diffuse lighting provided by multiple relatively large light sources is often most effective in enhancing such contrasts. Unfortunately, where a portable scanning device is used to optically capture encoded indicia, such use of multiple relatively large diffuse light sources may not be possible. By way of example, the need for portability may impose a requirement that any light sources used to illuminate a portion of a surface of an object that carries an encoded indicia to be scanned must be incorporated into the scanning device, itself. Alternatively or additionally, the need for portability may preclude the use of any other electric power source than a portable power source of limited capacity that is incorporated into the scanning device, such as a battery. Thus, multiple relatively large diffuse light sources may be too bulky to be so incorporated into the scanning device and/or may consume too much electric power. As a result, it may be necessary to incorporate a somewhat less ideal light source of plurality of light sources into such a portable scanning device that may successfully address the aforementioned contrast difficulties, but may do so in a manner that may be create other illumination issues.

By way of an example of such other illumination issues, and as will be explained in greater detail, to provide sufficient illumination in situations where the scanning device is operated to capture an image of an encoded indicia from a relatively short distance from the encoded indicia, such a portable scanning device may be required to provide diffuse lighting from multiple light sources that closely surround the image sensor and/or associated optics of the scanning device in a manner that creates a shadow region of insufficient illumination within the field of view (FOV) of the scanning device. More specifically, such a shadow region may be created on the surface of the object at or adjacent to the center of the scanning device FOV such that a portion of a barcode that is centered within the scanning device FOV may be rendered unreadable.

By way of another example of such other illumination issues, and as will also be explained in greater detail, to provide sufficient illumination in situations where the scanning device is operated to capture an image of an encoded indicia from a relatively long distance from the encoded indicia, such a portable scanning device may be required to incorporate and employ a light source that provides non-diffuse lighting. However, such use of non-diffuse lighting can cause instances of blinding of the image sensor of the scanning device with a direct reflection of the non-diffuse lighting from the surface of the object. Such blinding of the image sensor may be greatly exacerbated in situations where the encoded indicia to be scanned is carried on an object surface that is relatively reflective (e.g., relatively highly polished, mirror-like, etc.).

One prior art solution to such blinding of the image sensor of a portable scanning device has been to incorporate a pair of polarizing filters into the portable scanning device. The non-diffuse light emanating from the light source may be caused to pass through a first polarizing filter before proceeding onward to illuminate the portion of the surface of the object that carries the encoded indicia. A second polarizing filter may be positioned in front of the image sensor such that the light reflected from the object surface toward the image sensor is caused to pass through the second polarizing filter before reaching the image sensor. The second polarizing filter may be positioned within the scanning device with an orientation that is rotated 90 degrees relative to the first polarizing filter. As a result, any direct reflection of light from the light source to image sensor by the object surface is greatly reduced in intensity such that any blinding of the image sensor is at least greatly reduced. Unfortunately, as those skilled in the art will readily recognize, this prior art solution also results in an overall reduction in the light reflected from the location of the encoded indicia that reaches the image sensor, which erodes the effectiveness of the use of the illumination provided by the light source.

Thus, a need exists to provide, within a portable scanning device, effective lighting of encoded indicia directly marked on the surface of an object to improve contrast for purposes of capturing an image of the encoded indicia.

SUMMARY OF THE INVENTION

Technologies are described for more efficiently illuminating an encoded indicia marked directly on a surface of an object using components able to be incorporated into a portable scanning device.

A scanning device configured to scan an indicia carried on a surface of an object includes a scanner head that includes: an elongate upper housing portion that defines a scanner head axis, and that includes a nose end through which the scanner head axis extends; an image sensor carried within the upper housing portion, and configured to capture an image of the indicia; an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV; and a longer distance light source carried by the upper housing portion, and configured to illuminate the surface of the object at a relatively long distance with non-diffuse light. The scanning device optical axis is tilted relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

A method for minimizing blindness of a scanning device configured to scan an indicia carried on a surface of an object includes: forming a housing of the scanning device to comprise an elongate upper housing portion that defines a scanner head axis; forming the upper housing to include a nose end through which the scanner head axis extends and is configured to be pointed toward the object during the scan of the indicia; positioning an image sensor configured to capture an image of the indicia within the upper housing portion; positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV; incorporating, into the upper housing portion, a longer distance light source configured to illuminate the surface of the object at a relatively long distance with non-diffuse light; and tilting the scanning device optical axis relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

A scanning device configured to scan an indicia carried on a surface of an object includes: an elongate upper housing portion that defines a scanner head axis, and that includes a nose end through which the scanner head axis extends; an image sensor carried within the upper housing portion, and configured to capture an image of the indicia; and an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor. The scanning device also includes a lighting cone through which the light reflected passes from a relatively wide end of the lighting cone adjacent the nose end and to having a relatively narrow end of the lighting cone adjacent the optics component, the lighting cone including: a conically shaped side wall that extends between and circumferentially about the relatively narrow end and the relatively wide end, and that is configured to diffuse light that passes through the side wall; and a narrow end wall that closes the relatively narrow end, and is configured to be optically clear to enable the reflected light to pass through the narrow end wall to reach the optics component. The scanning device further includes: at least one shorter distance light source carried within the upper housing portion at a location external to the lighting cone with the side wall interposed between the at least one shorter distance light source and the nose end to cause light emanating from the at least one short distance light source to be made diffuse by the side wall before reaching the surface of the object; wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and wherein the scanning device optical axis is tilted relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

A method for improving the scanning of indicia carried on a surface of an object by a scanning device configured to scan the indicia includes: forming a housing of the scanning device to comprise an elongate upper housing portion that defines a scanner head axis; forming the upper housing to include a nose end through which the scanner head axis extends and is configured to be pointed toward the object during the scan of the indicia; positioning an image sensor configured to capture an image of the indicia within the upper housing portion; and positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV. The method also includes positioning a lighting cone having a relatively narrow end and a relatively wide end within the upper housing portion with the relatively narrow end adjacent the optics component and the relatively wide end adjacent the nose end of the upper housing portion, wherein: the lighting cone comprises a conically shaped side wall that extends between and circumferentially about the relatively narrow end and the relatively wide end, and that is configured to diffuse light that passes through the side wall; and the lighting cone is oriented within the upper housing portion to enable the scanning device FOV to extend through the lighting cone from the optics component adjacent the relatively narrow end and through the nose end of the upper housing portion adjacent the relatively wide end. The method further includes positioning at least one shorter distance light source within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object, wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV. The method still further includes tilting the scanning device optical axis relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

BRIEF DESCRIPTION OF THE DRAWINGS

FIGS. 4A and 4B, collectively referred to herein as FIG. 4, shows aspects of the operation of the prior art scanning device of FIG. 1.

DETAILED DESCRIPTION OF THE INVENTION

Figure 1A:
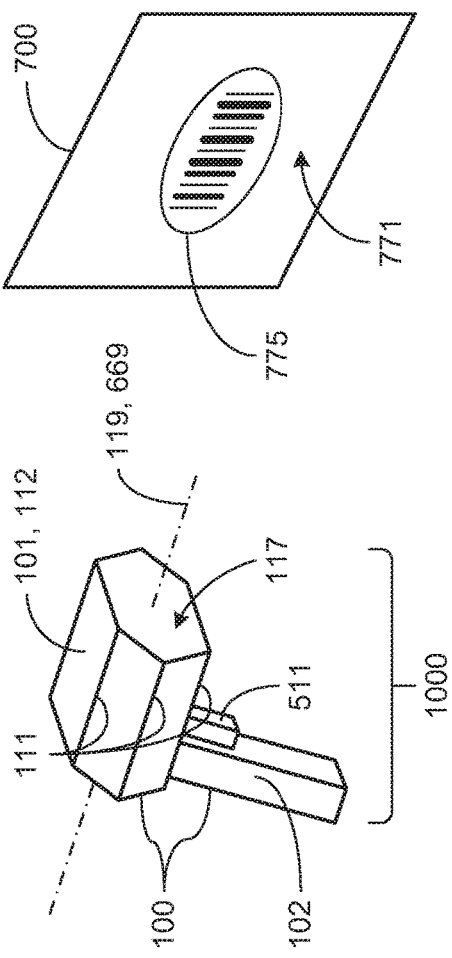
FIGS. 1A and 1B, collectively referred to herein as FIG. 1, show aspects of an example prior art portable scanning device.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disclosed herein is a portable scanning device incorporating lighting components to more effectively illuminate an encoded indicia marked directly on a surface of an object. Embodiments of the disclosure, as described more fully below, may improve the ability of a portable scanning device to scan an indicia in a variety of lighting conditions, and with the surface on which the indicia is carried position at a variety of distances from the portable scanning device and oriented at a variety of angles relative to a scanning device optical axis defined by the scanning device.

A scanning device configured to scan an indicia carried on a surface of an object includes a scanner head that includes: an elongate upper housing portion that defines a scanner head axis, and that includes a nose end through which the scanner head axis extends; an image sensor carried within the upper housing portion, and configured to capture an image of the indicia; an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV; and a longer distance light source carried by the upper housing portion, and configured to illuminate the surface of the object at a relatively long distance with non-diffuse light. The scanning device optical axis is tilted relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

A method for minimizing blindness of a scanning device configured to scan an indicia carried on a surface of an object includes: forming a housing of the scanning device to comprise an elongate upper housing portion that defines a scanner head axis; forming the upper housing to include a nose end through which the scanner head axis extends and is configured to be pointed toward the object during the scan of the indicia; positioning an image sensor configured to capture an image of the indicia within the upper housing portion; positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV; incorporating, into the upper housing portion, a longer distance light source configured to illuminate the surface of the object at a relatively long distance with non-diffuse light; and tilting the scanning device optical axis relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

A scanning device configured to scan an indicia carried on a surface of an object includes: an elongate upper housing portion that defines a scanner head axis, and that includes a nose end through which the scanner head axis extends; an image sensor carried within the upper housing portion, and configured to capture an image of the indicia; and an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor. The scanning device also includes a lighting cone through which the light reflected passes from a relatively wide end of the lighting cone adjacent the nose end and to having a relatively narrow end of the lighting cone adjacent the optics component, the lighting cone including: a conically shaped side wall that extends between and circumferentially about the relatively narrow end and the relatively wide end, and that is configured to diffuse light that passes through the side wall; and a narrow end wall that closes the relatively narrow end, and is configured to be optically clear to enable the reflected light to pass through the narrow end wall to reach the optics component. The scanning device further includes: at least one shorter distance light source carried within the upper housing portion at a location external to the lighting cone with the side wall interposed between the at least one shorter distance light source and the nose end to cause light emanating from the at least one short distance light source to be made diffuse by the side wall before reaching the surface of the object; wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and wherein the scanning device optical axis is tilted relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

A method for improving the scanning of indicia carried on a surface of an object by a scanning device configured to scan the indicia includes: forming a housing of the scanning device to comprise an elongate upper housing portion that defines a scanner head axis; forming the upper housing to include a nose end through which the scanner head axis extends and is configured to be pointed toward the object during the scan of the indicia; positioning an image sensor configured to capture an image of the indicia within the upper housing portion; and positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV. The method also includes positioning a lighting cone having a relatively narrow end and a relatively wide end within the upper housing portion with the relatively narrow end adjacent the optics component and the relatively wide end adjacent the nose end of the upper housing portion, wherein: the lighting cone comprises a conically shaped side wall that extends between and circumferentially about the relatively narrow end and the relatively wide end, and that is configured to diffuse light that passes through the side wall; and the lighting cone is oriented within the upper housing portion to enable the scanning device FOV to extend through the lighting cone from the optics component adjacent the relatively narrow end and through the nose end of the upper housing portion adjacent the relatively wide end. The method further includes positioning at least one shorter distance light source within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object, wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV. The method still further includes tilting the scanning device optical axis relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

FIG. 1 depicts aspects of a PRIOR ART portable scanning device 1000 employed to optically scan an encoded indicia 775 marked directly on a portion of a surface 771 of an object 700. As depicted, the scanning device 1000 may have a housing 100 that may be shaped and/or sized in a manner that gives the scanning device 1000 a portable "gun-like" configuration to provide portability and comfort for one-handed carrying and operation.

The housing 100 includes a scanner head portion 101 and a handle portion 102. The scanner head portion 101 has a side wall 112 that defines an elongate hollow tubular shape within which various components to effect the scanning of the encoded indicia 775 may be installed, that defines a scanner head axis 119 of the scanner head portion 101, and that defines two ends of the scanner head portion 101, including a nose end 117, through which the scanner head axis 119 extends. As will shortly be explained in greater detail, the side wall 112 may incorporate contouring and/or other external physical features that may provide visual cues to an operator of the scanning device 1000 of the location and/or orientation of the scanner head axis 119.

The handle portion 102 also has an elongate shape that has a circumferential shape and size that causes the handle portion 102 to fit comfortably within a typical adult-sized hand, and that defines two ends of the handle portion 102, with one of the two ends of the handle portion 102 being attached to a portion of the side wall 112 of the scanner head portion 101. The handle portion 102 may also carry a trigger switch 511 at a location that may also be reminiscent of the location of the trigger of a hand gun, and that is operable to trigger the capture of an image of the encoded indicia 775.

Where an operator of the scanning device 1000 is successfully induced to hold the scanning device 1000 with one hand by the handle portion 102 in a gun-like manner, the operator may be successfully induced to hold the scanning device 1000 in an upright orientation that places the scanner head portion 101 above the handle portion 102, at least at times when the operator uses the scanning device 1000 to capture an image of the encoded indicia 775. In such an upright orientation, the scanner head axis 119 may extend horizontally, and over the operator's hand and the handle portion 102. As will shortly be explained in greater detail, various visual cues provided to an operator of the location and/or orientation of the scanner head axis 119 may be relied upon to induce the operator to point the scanning device 1000 at the encoded indicia 775 in a manner that causes the encoded indicia 775 to be positioned inline with the scanner head axis 119 such that the scanner head axis 119 extends therethrough.

As will also be described in greater detail, the various scanning components installed within the scanner head portion 101 cooperate to illuminate the portion of the surface 771 of the object 700 on which the encoded indicia 775 is directly carried, and to receive light reflected therefrom through the node end 117. More precisely, the various scanning components installed within the scanner head portion 101 cooperate to define a scanning device field of view (FOV) 447 that extends along a scanning device optical axis 669, which may extend generally along (i.e., aligned so as to be coincident with) and/or parallel to the scanner head axis 119. As a result of the gun-like configuration of the scanning device 1000, which may tend to induce the operator of the scanning device 1000 to point the nose end 117 toward the portion of the surface 771 of the object 700 on which the encoded indicia 775 is carried (at least while holding the scanning device 1000 in the aforedescribed upright orientation), the operator may thereby be caused to orient the scanning device 1000 in such a manner as to position the encoded indicia 775 along the scanning device optical axis 669, and therefore, within the scanning device FOV 447.

Figure 1B:
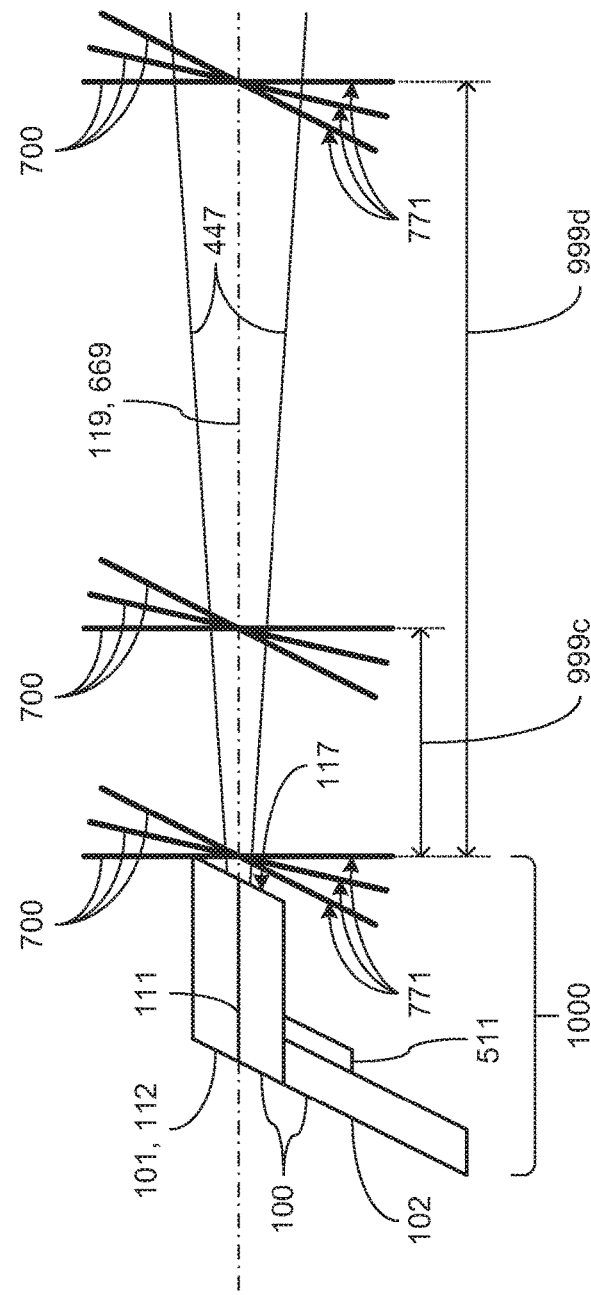

Turning more specifically to FIG. 1B, as depicted, the scanning device 1000 is capable of effectively scanning the encoded indicia 775 with the portion of the surface 771 that carries the encoded indicia 775 positioned within a relatively wide range of distances from the nose end 117, from a position close to or in contact with a portion of the nose end 117, to a relatively close position 999c that may be at a relatively short distance from the nose end 117 (e.g., a few centimeters or a few inches away), to a relatively distant position 999d that may be at a relatively long distance from the node end 117 (e.g., multiple feet or multiple meters away).

FIG. 2 depicts aspects of defining the scanner head axis 119 of the PRIOR ART portable scanning device 1000 of FIG. 1, as well as in various alternate example embodiments of the PRIOR ART scanning device 1000. As will shortly be explained in greater detail, various approaches from contouring of the side wall 112 of the scanner head portion 101 to the projection of a dot of light on the surface 771 of the object 700 may be employed to provide an operator of the scanning device 1000 with visual cues concerning the location and orientation of the scanner head axis 119.

Figure 2A:
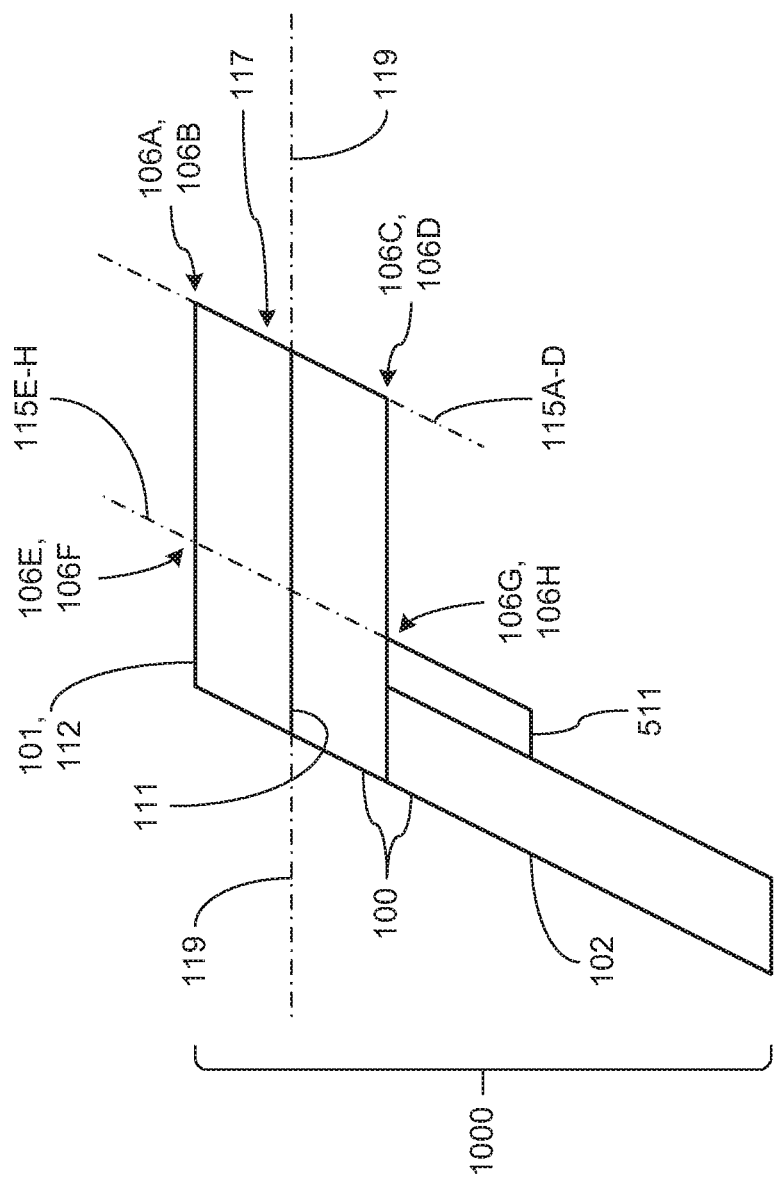
FIGS. 2A, 2B, 2C, 2D, 2E, 2F, 2G and 2H, collectively referred to herein as FIG. 2, shows further aspects of defining a scanner head axis of prior art scanning devices.
Figure 2B:
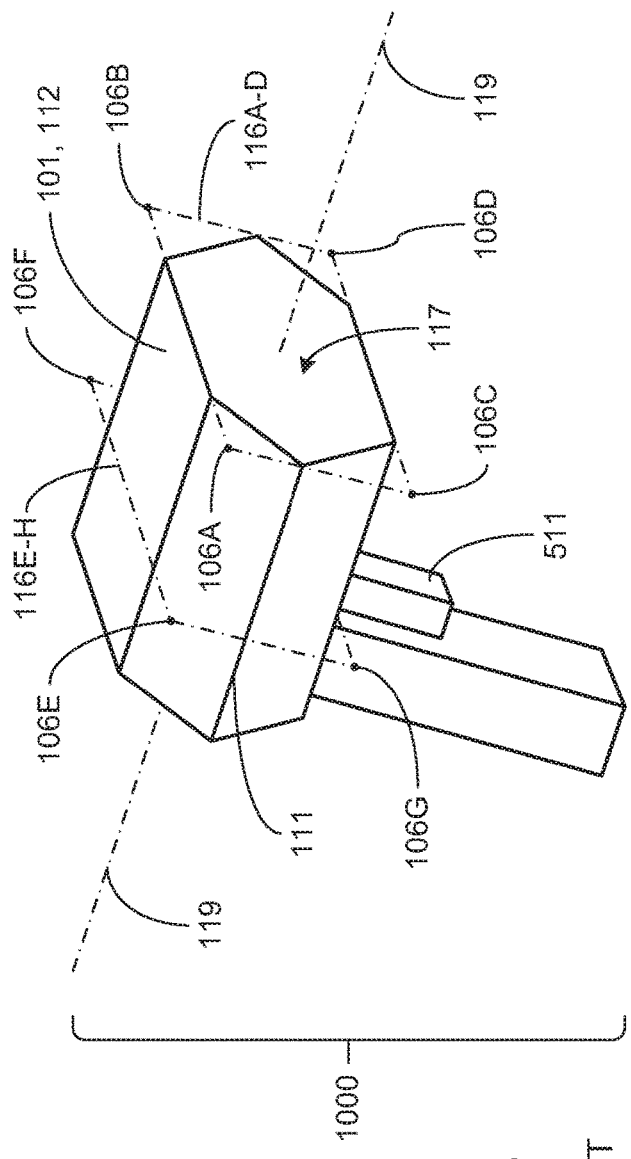
Figure 2C:
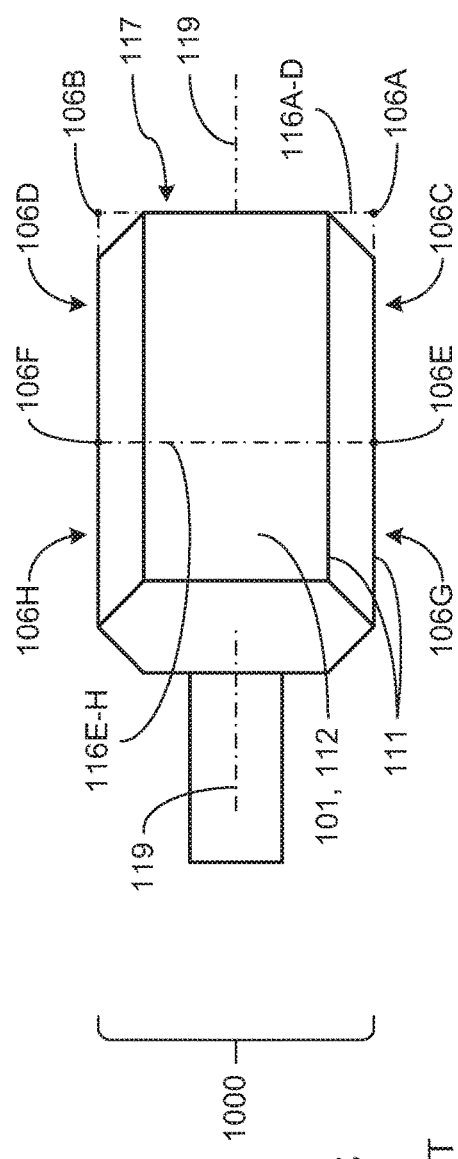
Figure 2D:
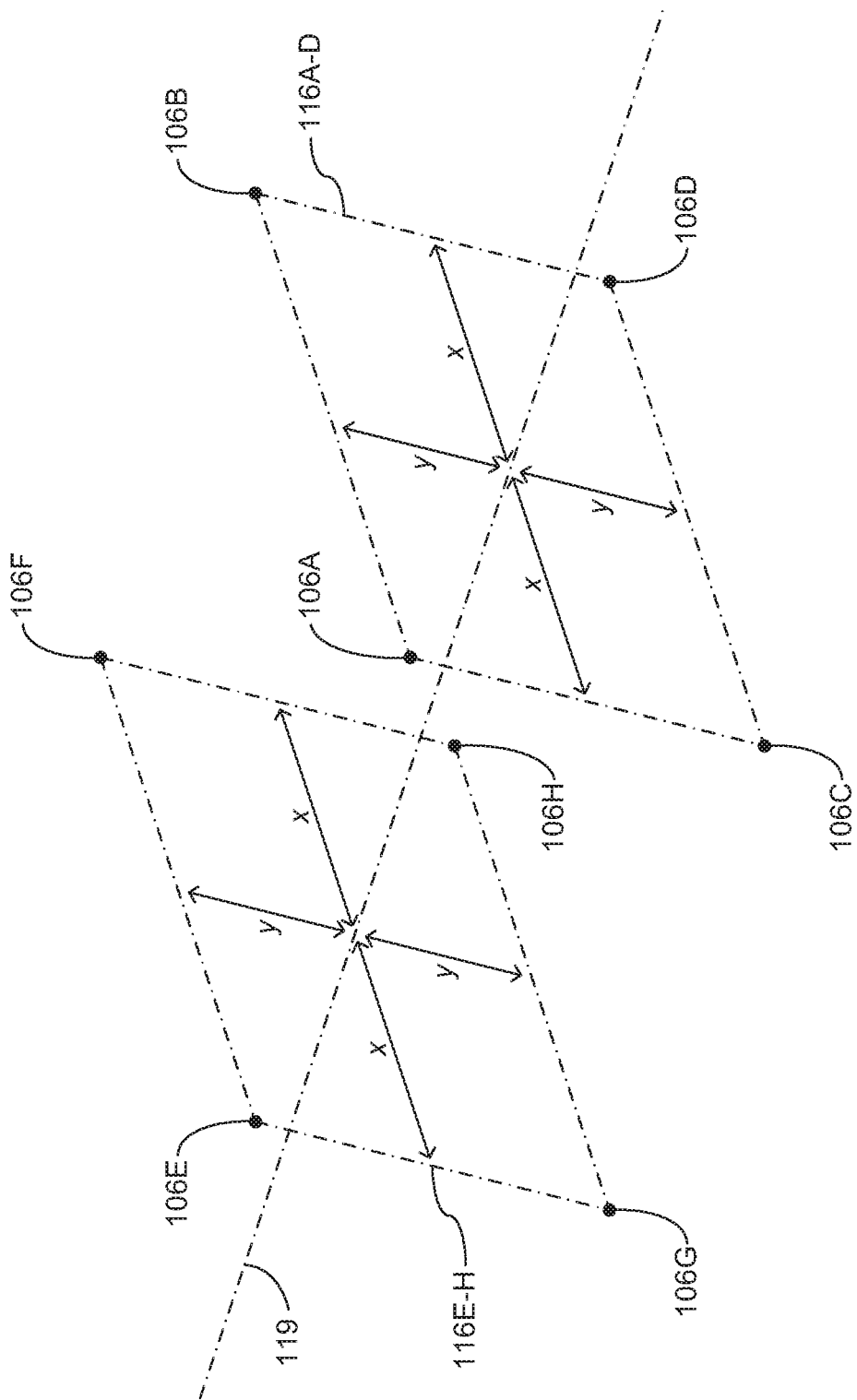

Turning more specifically to FIGS. 2A-C, as well as referring back to FIGS. 1A-B, in embodiments of the PRIOR ART portable scanning device 1000, such as the embodiment introduced in FIGS. 1A-B and again depicted in FIGS. 2A-C, portions of the side wall 112 of the scanner head portion 101 may incorporate any of a variety of forms of contouring that also serve to provide a visual cue of at least the vertical elevation and orientation of the scanner head axis 119. Specifically, the depicted folds 111 are formed to extend horizontally along left and right side portions of the side wall 112 when the PRIOR ART portable scanning device 1000 is held in the aforementioned upright "gun-like" orientation to explicitly visually define the vertical elevation and orientation of the scanner head axis 119 such that, when viewed from the left or right side while held in the aforementioned upright orientation (such as in the elevational view provided by FIG. 2A), the side wall folds 111 are seen to align with the scanner head axis 119.

Regarding the horizontal position and orientation of the scanner head axis 119, as will be appreciated by those skilled in the art, the usually symmetrical left-to-right configuration of most hand guns and other gun-like objects (e.g., electric drills, soldering guns, hot glue guns, toy guns, fictional guns presented in television and movies, etc.) is likely to instill an almost innate expectation that the scanner head axis 119 will be horizontally positioned in a manner that is centered between the left and right sides of the scanner head portion 101. Further, such influences is likely to similarly instill an almost innate expectation that the scanner head axis 119 will be horizontally oriented to extend lengthwise within the elongate shape of the scanner head portion 101.

More generally, and turning to FIGS. 2A-E, the aforedescribed influences of hand guns and/or other gun-like objects generally instills an almost innate recognition that the "barrel-like" generally elongate shape of the scanner head portion 101 defines the scanner head axis 119 to extend therethrough in an orientation that follows the elongate lengthwise dimension thereof and with a position that is generally centered within and along the lengthwise dimension thereof. Such a commonly instilled recognition of position and orientation of the scanner head axis 119 through the scanner head portion 101 may be more formally described as the scanner head axis 119 extending through the center of (i.e., centered both horizontally and vertically within) a pair of bounding boxes 116A-D and 116E-H that are each defined at one of two different locations along the length of the scanner head portion 101 by aspects of the exterior shape of a cross-section taken through the scanner head portion 101 at each of those two different locations.

As depicted, each of the two bounding boxes 116A-D and 116E-H is of rectangular shape, with points 106A through 106D at each of the right-angled corners of the bounding box 116A-D, and with points 106E through 106H at each of the right-angled corners of the bounding box 116E-H. The bounding box 116A-D may be positioned at the nose 117 of the scanner head portion 101, while the bounding box 116E-H may be positioned at the location of the most forward portion of the trigger switch 511. Within each of the bounding boxes 116A-D and 116E-H, the point at which the scanner head axis 119 passes therethrough is centered horizontally and vertically therein (i.e., with equal horizontal distances x and equal vertical y between opposed edges).

Each of the two bounding boxes 116A-D and 116E-H may extend within a corresponding plane 115A-D and 115E-H, respectively, and the two planes 115A-D and 115E-H may extend in parallel to each other. The position and orientation of the plane 115A-D may be defined by the shape and/or other physical features of the nose 117. More precisely, a first-order approximation of the shape and/or other physical features of the nose 117 may be used to derive the location of the plane 115A-D along the scanner head axis 119, and to determine whether the plane 115A-D extends perpendicularly to the scanner head axis 119 or at some other angle of inclination relative to the plane 115A-D. The forward-most portion of the trigger switch 551 (i.e., the portion of the trigger switch 551 that is closest to the nose 117), or a first-order approximation thereof, may be used to derive a point through which the plane 115E-H extends, and the orientation of the plane 115E-H relative to the scanner head axis 119 may be determined by the orientation of the plane 115A-D as a result of these two planes extending in parallel to each other.

Figure 2E:
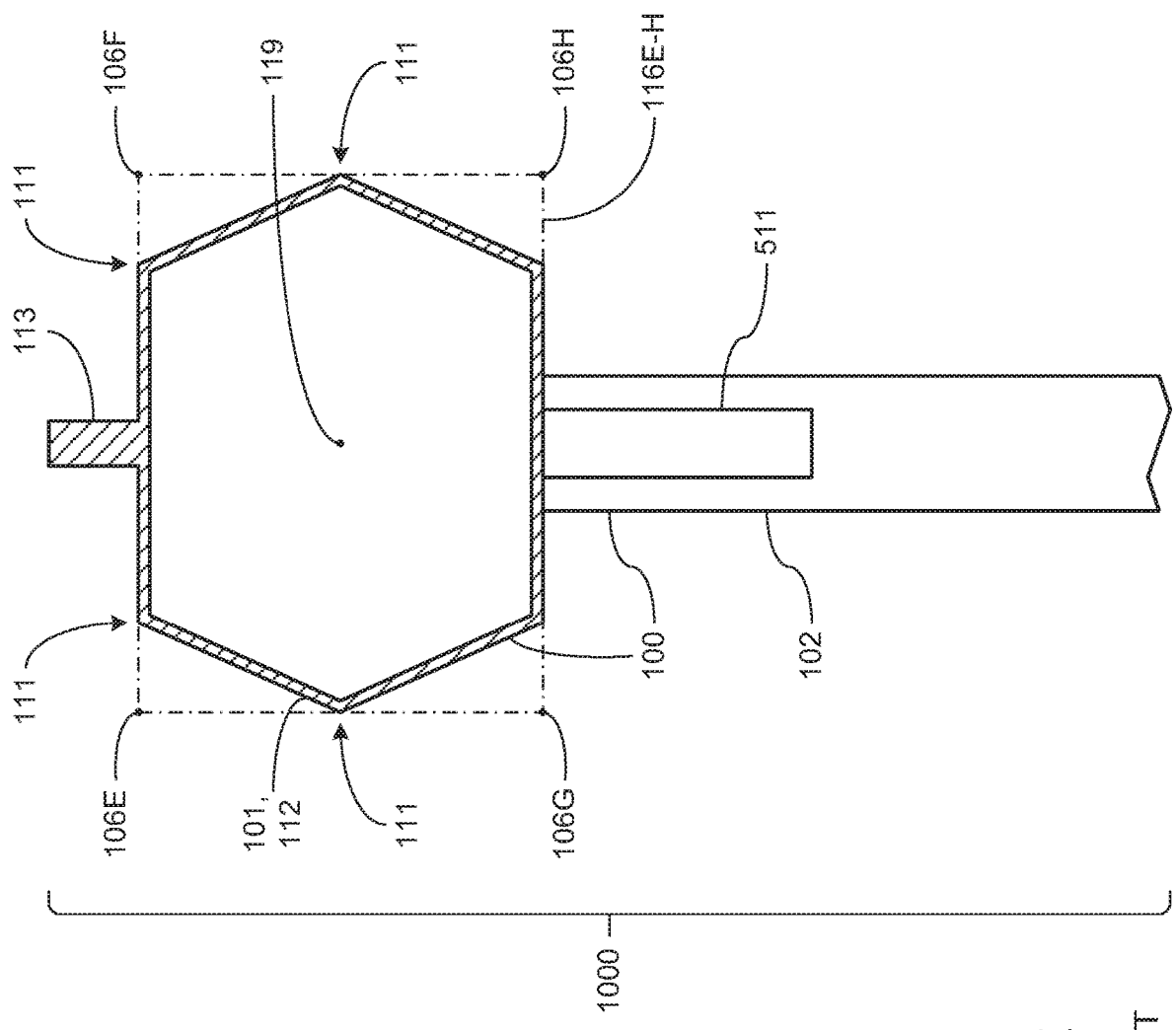
Figure 2F:
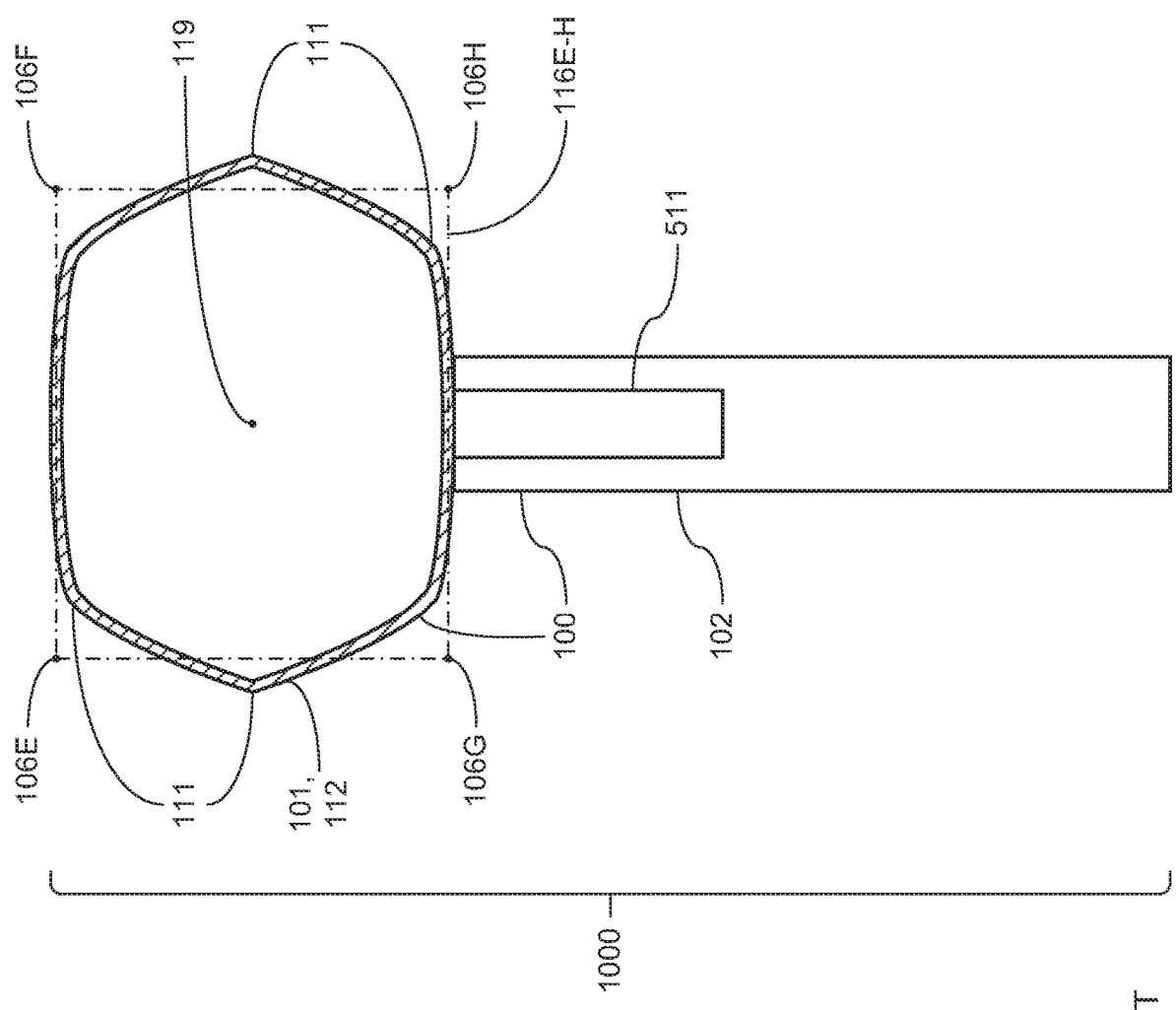
Figure 2G:
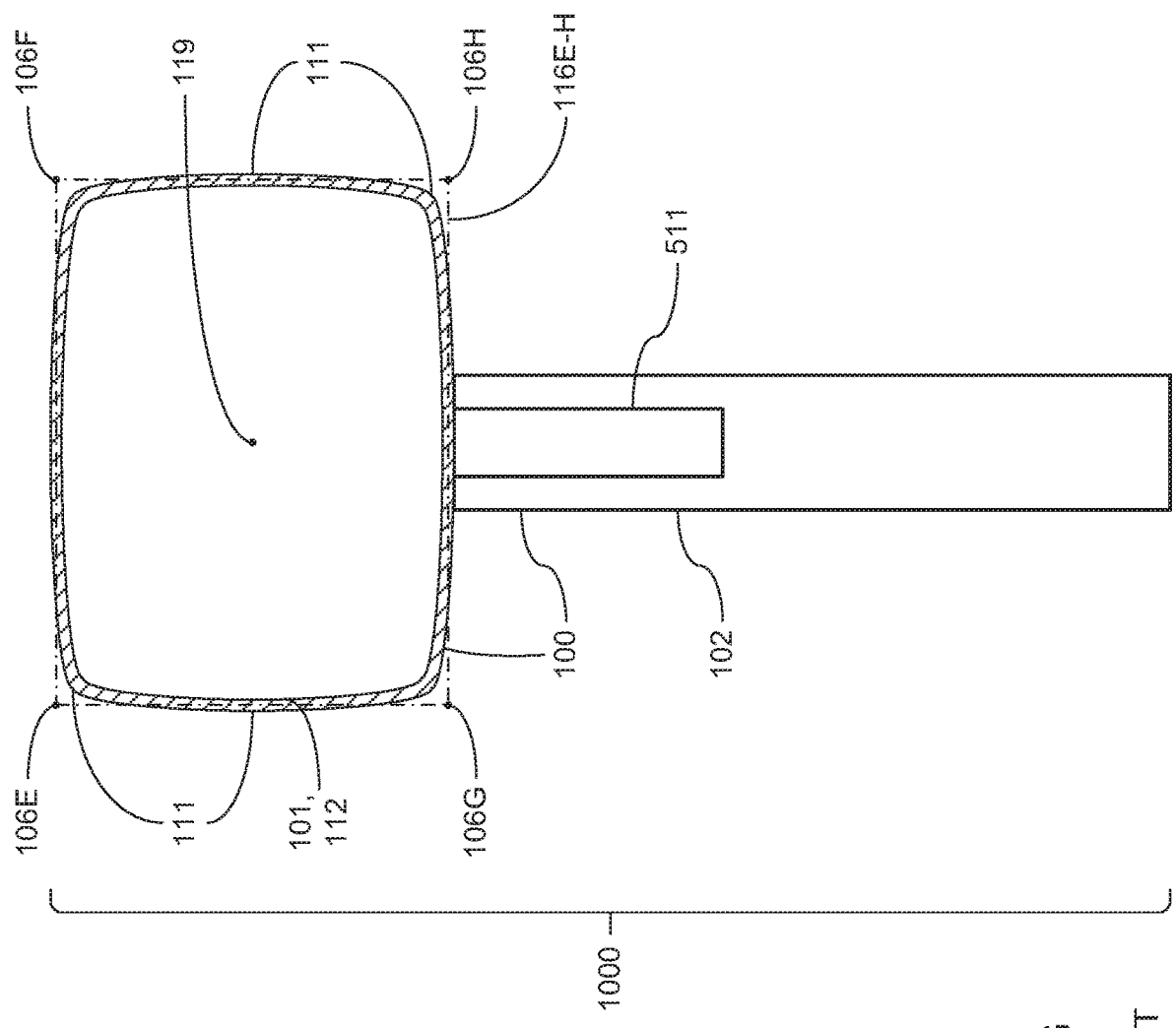

Turning more specifically to FIGS. 2E-G, the locations of the edges of each of the bounding boxes 116A-D and 116E-H within the planes 115A-D and 115E-H may be derived from outer edge portions of cross-sections taken through scanner head portion 101 within the planes 115A-D and 115E-H, respectively, through the use of any of a variety of first-order approximations using any of a variety of coefficients and/or accompanied by any of a variety of non-linear constraint functions. More precisely, the example bounding box 116E-H depicted in FIG. 2E may be derived from the portions of the generally hexagonal example cross-section of the side wall 112 that are horizontally and vertically furthest away from the center of that cross-section. However, as also depicted in FIG. 2E, protrusions (e.g., the depicted gun-like sight 113) and/or other portions of the side wall 112 that extend out of the plane of the side wall 112 by at a predetermined degree and/or that extend across less than a predetermined percentage of the width (e.g., less than 20%) of the corresponding edge of the bounding box 116E-H may not be taken into account in determining the location of that edge.

Alternatively, the example bounding box 116E-H depicted in FIG. 2F may be derived as a smoothing and/or averaging of horizontal and vertical distances of portions of the generally rounded hexagonal example cross-section of the side wall 112 from the center of that cross-section. Similarly, the example bounding box 116E-H depicted in FIG. 2G may be similarly derived as a smoothing and/or averaging of horizontal and vertical distances of portions of the generally rounded rectangular example cross-section of the side wall 112 from the center of that cross-section.

Figure 2H:
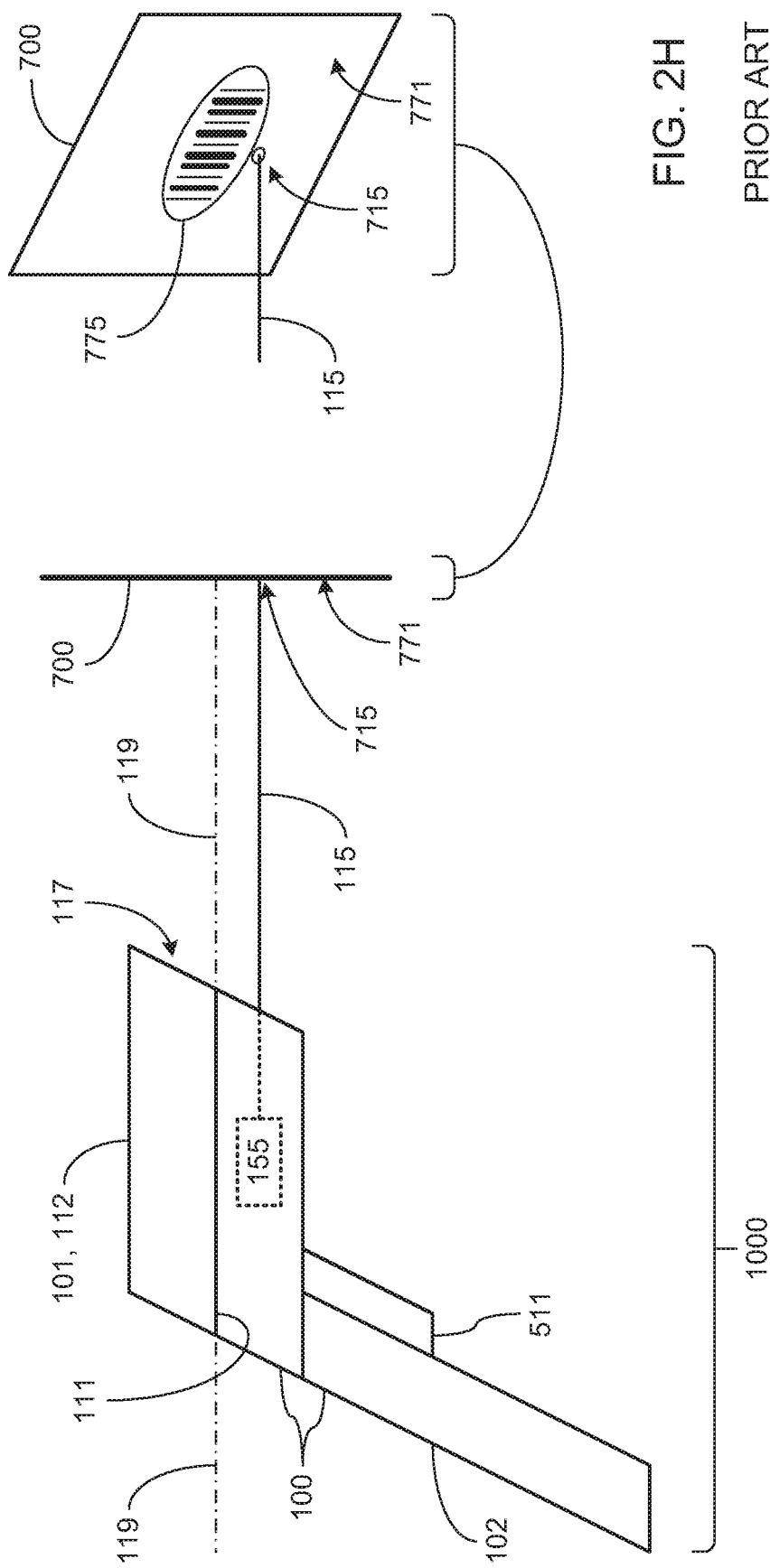

Turning to FIG. 2H, as still another alternative to the use of the shape, contouring and/or other physical features of the side wall 112 to define the location and/or orientation of the scanner head axis 119, other embodiments of the PRIOR ART portable scanning device 1000 may incorporate a light source 155 that projects a relatively narrow beam of light, either along the scanner head axis 119, or at least parallel to the scanner head axis 119, to cause the projection of a luminous dot or other relatively small luminous marker on the surface 771 of the object 700 at a location that provides a visual cue to the operator of at least where the scanner head axis 119 hits the surface 771. The light source 155 may be a laser light emitting device, or may be a combination of a non-laser light-emitting device and one or more optical elements (e.g., lenses, mirrors, apertures, etc.) to form the relatively narrow beam from the output of the non-laser light-emitting device.

FIG. 3 depicts aspects of various scanning components incorporated into the scanner head portion 101 of the PRIOR ART portable scanning device 1000, including (and turning more specifically to FIG. 3A) a lighting cone 200; light sources 303, 304 and 306; an optics component 400; an image sensor 500 and a support circuitboard 551. As will shortly be explained in greater detail, these scanning components cooperate to both illuminate and capture an image of the portion of the surface 771 of the object 700 that carries the encoded indicia 775 that falls within the scanning device FOV 447.

Figure 3A:
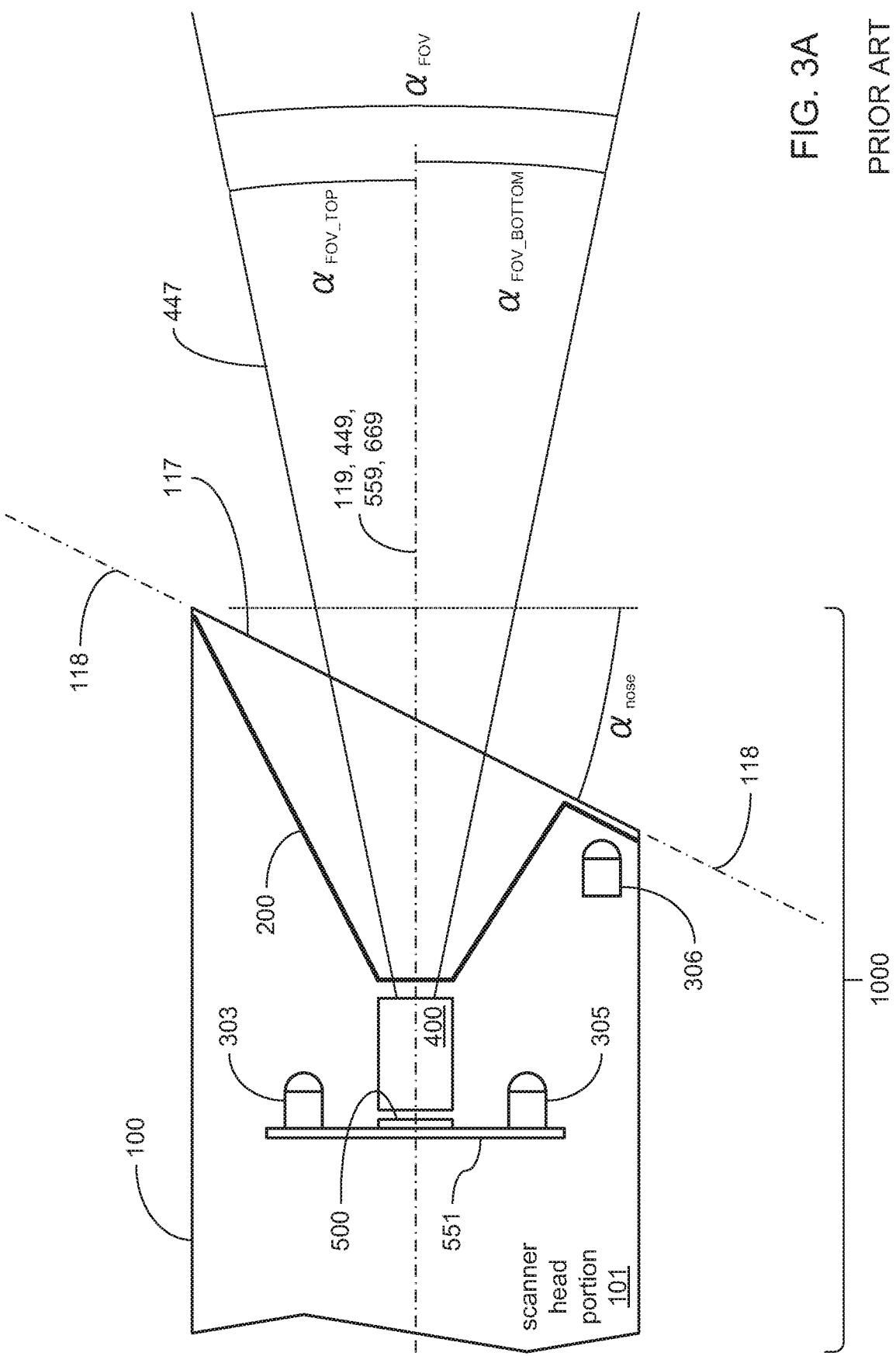
FIGS. 3A, 3B, 3C, 3D, 3E, 3F, 3G and 3H, collectively referred to herein as FIG. 3, shows aspects of components of the prior art scanning device of FIG. 1.
Figure 3C:
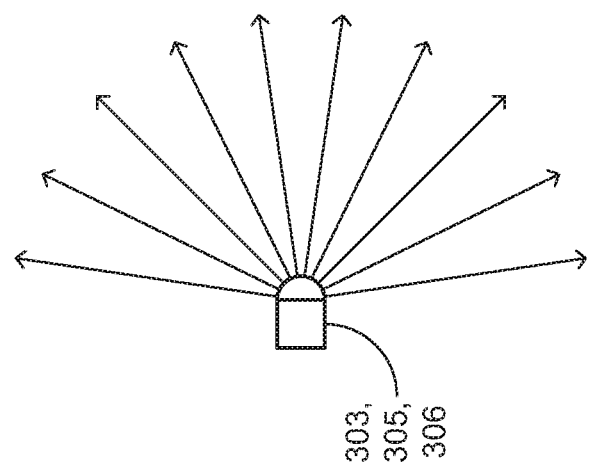

Also more clearly depicted in FIG. 3A is the manner in which the scanning device optical axis 669 may extend along the scanner head axis 119 such that they are aligned and become a single axis 119, 669 that extends through the nose end 117 of the scanner head portion 101 such that the scanning device FOV 447 also extends through the nose end 117 of the scanner head portion 101. With the scanning device 1000 held in the aforedescribed upright orientation, the angle of view of the scanning device FOV ($\alpha_{FOV}$) is vertically divisible into angles of view that are angled vertically by equal degrees upward and downward from the scanning device optical axis 669 (i.e., $\alpha_{FOV\_TOP}$ and $\alpha_{FOV\_BOTTOM}$, respectively). As further depicted, the nose end 117 of the scanner head portion 101 may be shaped and/or otherwise configured to define a nose end image plane 118, through which the scanner head axis 119, the scanning device optical axis 669 and the scanning device FOV 447 extend as each extends through the nose end 117. It should be noted that the image plane 118 may differ from the earlier-described plane 116A-D inasmuch as the image plane 118 represents the position and orientation at which the surface 771 of the object 700 is able to be positioned closest to (and in contact with) the nose 117.

As additionally depicted in FIG. 3A, with the scanning device 1000 held in the aforementioned upright orientation, the nose end image plane 118 may be vertically angled away from vertical by a predetermined angle ($\alpha_{nose}$) such that it is not perpendicular to the scanner head axis 119 when the scanner head axis is oriented to extend horizontally. This may be done to address situations in which the portion of the surface 771 of the object 700 that directly carries the encoded indicia 775 does not extend in a vertical plane. The angle $\alpha_{nose}$ may be selected to provide a visual guide to an operator of the scanning device 1000 of a maximum degree to which the portion of the surface 771 of the object 700 that directly carries the encoded indicia 775 should be rotated away from being perpendicular to the scanner head axis 119.

Figure 3B:
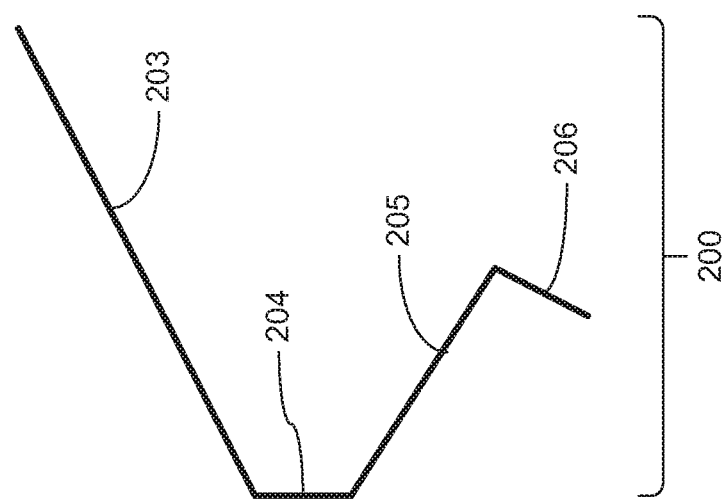

Turning more specifically to both FIGS. 3A and 3B, the lighting cone 200 includes diffusion portions 203 and 205, and transparent portions 204 and 206. As depicted the lighting cone 200 may be positioned within the scanner head portion 101 to be interposed between the nose end 117 of the scanner head portion 101 and each of the light sources 303, 305 and 306; the optics component 400; and the image sensor 500.

Each of the diffusion portions 203 and 205 are formed from either a translucent material or a transparent material that has been treated to make it translucent (e.g., either translucent white plastic or glass, or frosted transparent plastic or glass) for the purpose of diffusing light that passes therethrough. In contrast, each of the transparent portions 204 and 206 are formed from a transparent material (e.g., a transparent plastic or glass, etc.) for the purpose of allowing light to pass therethrough with relatively minimal diffusion or loss of intensity. Stated differently, the lighting cone 200 may be formed as a single integral piece of transparent material with the diffusion portions 203 and 205 treated to cause each to become translucent such that each diffuses light that passes therethrough, while each of the transparent portions 204 and 206 are not so treated so as to allow each to remain transparent. Alternatively, the diffusion portions 203 and 205 may be formed separately and/or of different materials from the transparent portions 204 and 206 (e.g., each of the diffusion portions 203 and 205 being formed of translucent material, while each of the transparent portions are formed of transparent material) that are then assembled to form the lighting cone 200.

Turning more specifically to FIGS. 3A and 3C-E, each of the light sources 303, 305 and 306 may be any of a variety of omnidirectional lighting devices, including and not limited to, light-emitting diodes (LEDs), incandescent bulbs, fluorescent bulbs and electroluminescent bulbs. Thus, all three of the light sources 303, 305 and 306 may be selected to be identical components to reduce manufacturing costs.

Figure 3E:
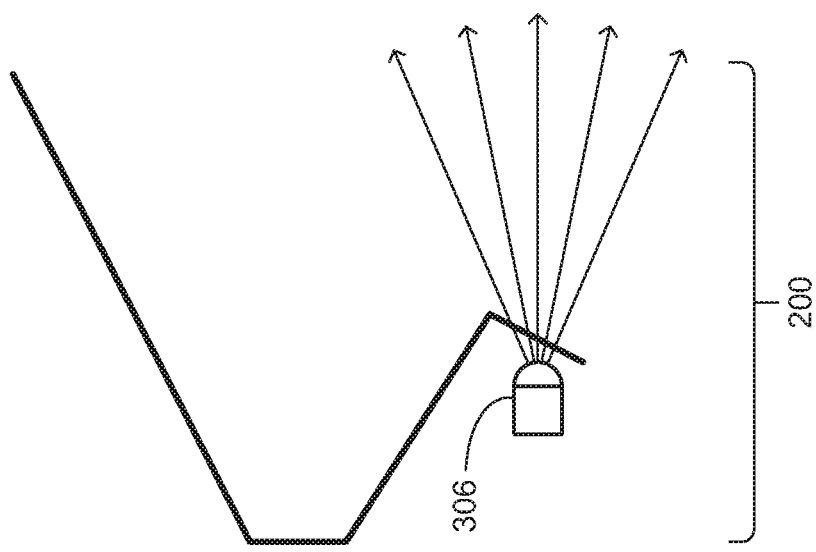
Figure 3D:
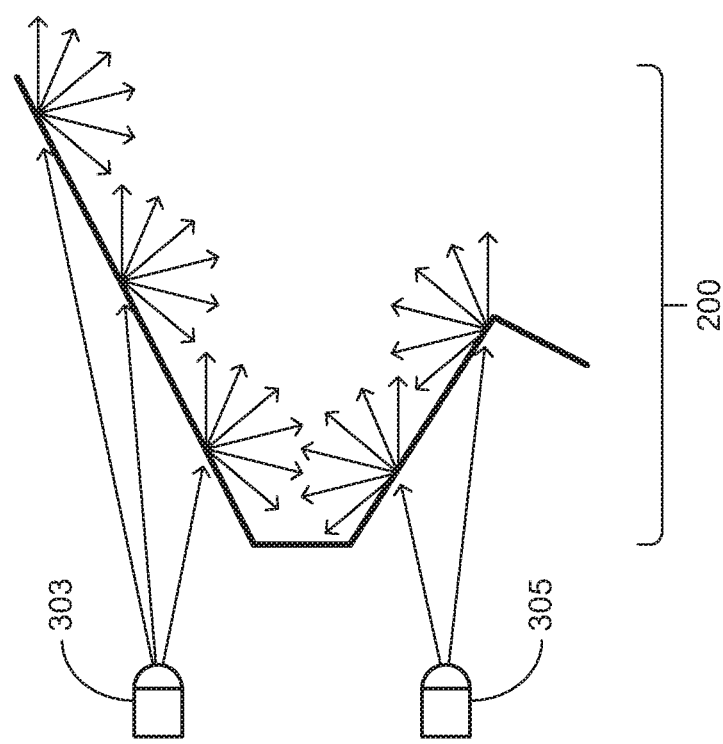

As depicted in FIG. 3A, each of the light sources 303 and 305 may be positioned within the scanner head portion 101 to relatively closely flank the optics component 400 and/or the image sensor 500. Thus, and as depicted in FIG. 3D, the light emanating from the light sources 303 and 305 is caused to pass through the diffusion portions 203 and 205, respectively, where diffusion of the light occurs such that the portion of the surface 771 of the object 700 that directly carries the encoded indicia 775 may be illuminated with a diffuse form of the light output by the light sources 303 and 305.

As those skilled in the art will readily recognize, diffuse lighting is less effective at illuminating a relatively distant object than non-diffuse lighting of the same intensity. Therefore, and as will be explained in greater detail, the diffuse lighting provided by the combination of the light sources 303 and 305 and the diffusion portions 203 and 205 of the lighting cone 200 may be effectively used where the encoded indicia 775 is positioned relatively close to the nose end 117 (e.g., within a few centimeters or inches of the nose end 117), but may become ineffective where the encoded indicia 775 is positioned at a relatively long distance from the node end 117 (e.g., at a few feet or meters from the nose end 117).

As also depicted in FIG. 3A, the light source 306 may be positioned within the scanner head portion 101 to be relatively close to the nose end 117, and with the transparent portion 206 of the lighting cone 200 interposed therebetween. Thus, the light source 306 is positioned further away from the optics component 400 than either of the light sources 303 and 305. As a result, and as depicted in FIG. 3E, the light emanating from the light source 306 is caused to pass through the transparent portion 206 where relatively little distortion or diminution of that light occurs such that the portion of the surface 771 of the object 700 that directly carries the encoded indicia 775 may be illuminated with the non-diffuse light output of light source 306.

As just discussed above, non-diffuse lighting is more effective at illuminating a relatively distant object than diffuse lighting of the same intensity. Therefore, and as will be explained in greater detail, the non-diffuse lighting provided by the light source 306 through the transparent portion 206 may be effectively used where the encoded indicia 775 is positioned at a relatively long distance from the nose end 117 (e.g., at a few feet or meters from the nose end 117).

Figure 3G:
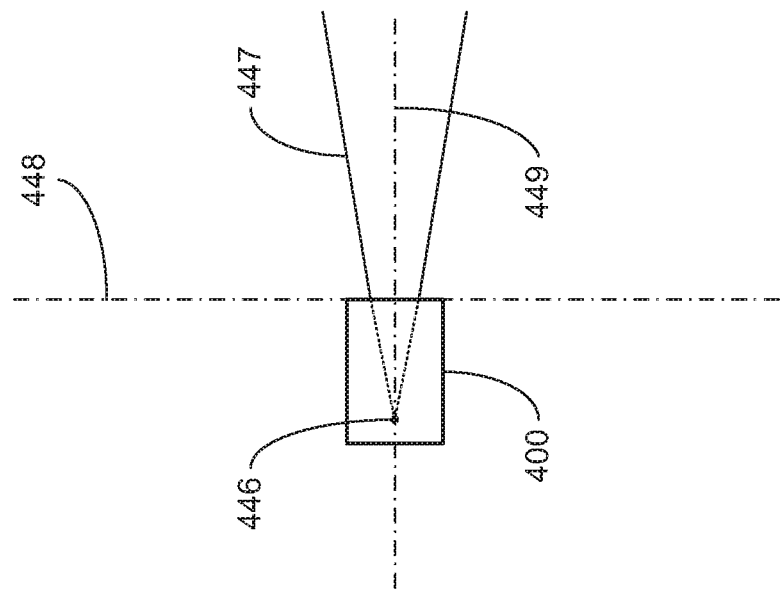
Figure 3F:
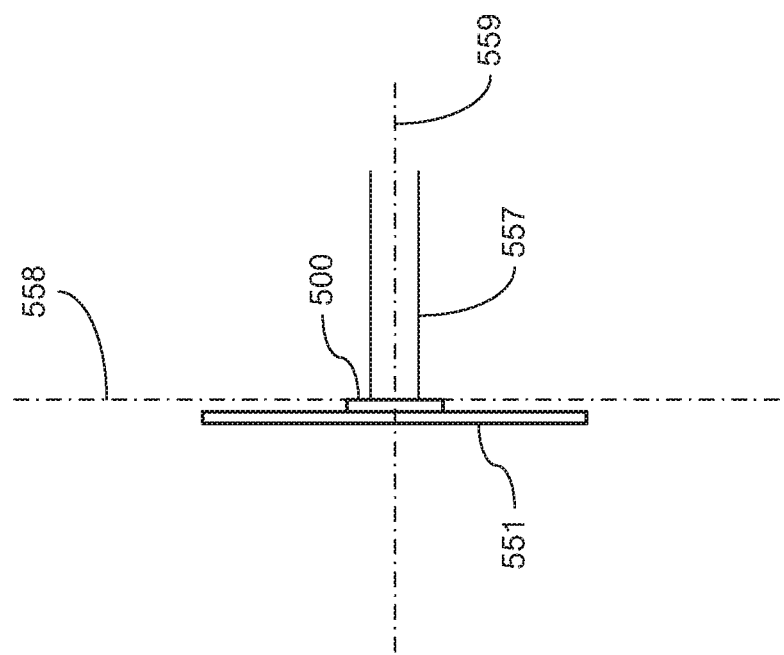

Turning more specifically to both FIGS. 3A and 3F, the image sensor 500 may be mounted onto the support circuitboard 551 (e.g., soldered to the support circuitboard 551 by its electrical contacts) which may, in turn, be mounted within the scanner head portion 101 to thereby mount the image sensor 500 therein. With the image sensor 500 so mounted, light reflected from an illuminated portion of the surface 771 of the object 700 reaches the image sensor 500 through transparent portion 204 of the lighting cone 200 and the optics component 400.

As will be familiar to those skilled in the art, the image sensor 500 may be a semiconductor device incorporating a two-dimensional (2D) grid of photo detectors (e.g., a charge-coupled device) that define a generally rectangular active area that, in turn, defines the image sensor FOV 557. As will also be familiar to those skilled in the art, such a 2D grid of photo detectors is typically arranged within a single plane, such as the depicted image sensor image plane 558. As depicted, the image sensor FOV 557 extends from the image sensor 500 (more precisely, from the image sensor image plane 558) with an unchanging width, and along an image sensor axis 559 that extends through and perpendicular to the image sensor image plane 558. The 2D grid of photo detectors are operable together to capture an image of what is visible to the image sensor 500 within the image sensor FOV 557. The resulting captured image is made up of a 2D grid of the light that is received by the 2D grid of photo detectors within the image sensor image plane 558.

Figure 3H:
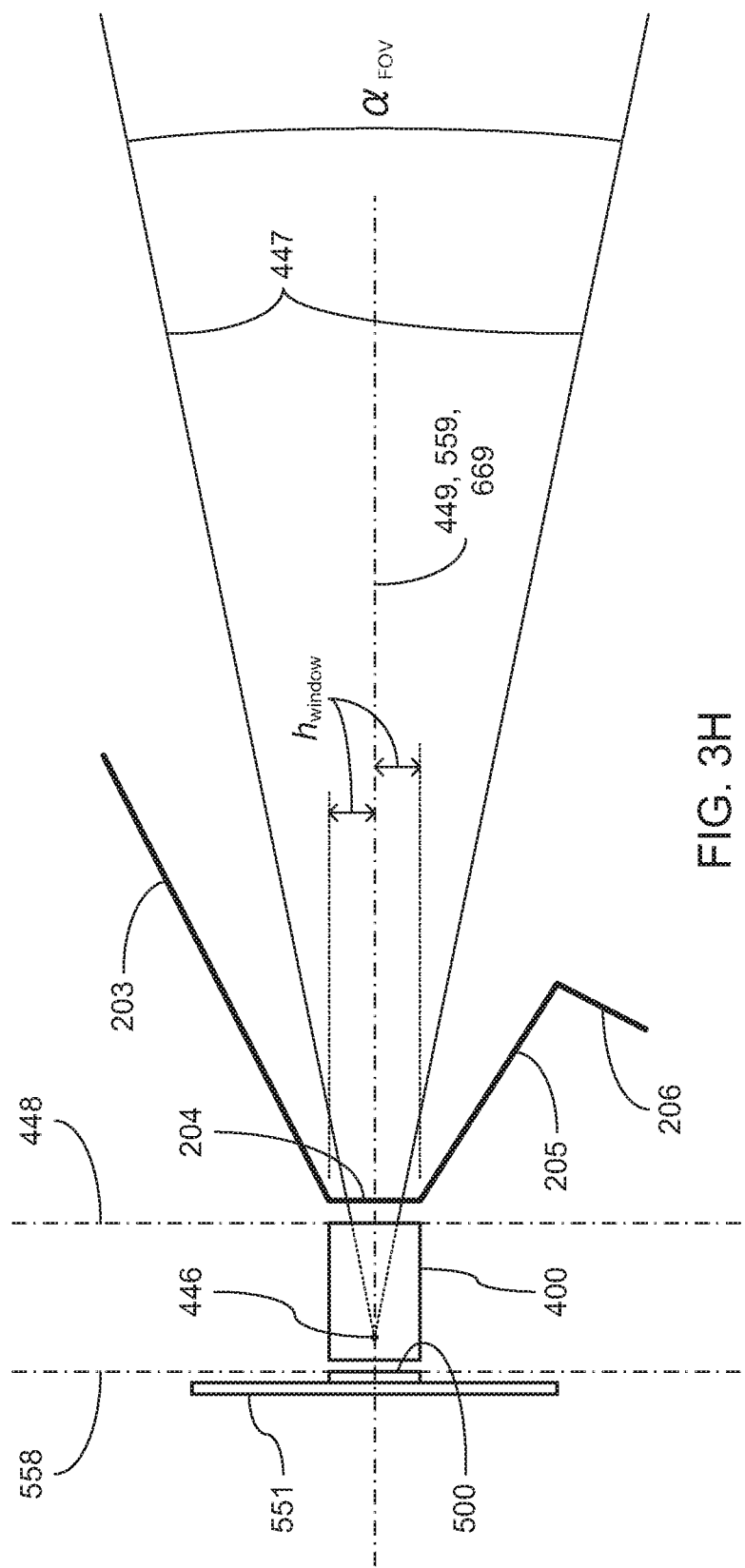

Turning more specifically to FIGS. 3A and 3G-H, the optics component 400 is mounted within the scanner head portion 101 at a location that is substantially along the image sensor axis 559 and that intercepts the image sensor FOV 557. Again, the optics component 400 is interposed between the image sensor 500 and the transparent portion 204 of the lighting cone 200, thereby enabling the optics component 400 to convey, to the image sensor 500, light that is reflected from an illuminated portion of the surface 771 of the object 700 and through the transparent portion 204. It should be noted that, as part of ensuring that the transparent portion 204 of the lighting cone 200 allows the reflected light to pass therethrough with a minimum of distortion and/or diminution, one or both sides of the transparent portion 204 may be treated with one or more optical coatings of a type that will be familiar to those skilled in the art.

The optics component 400 may include one or more lenses, mirrors, mechanical irises and/or other optical elements that may manipulate such reflected light in various ways that will be familiar to those skilled in the art while so conveying the reflected light to the image sensor 500. Among the various forms of manipulation that may be performed by the optics component 400 may be altering the image sensor FOV 557 to change its constant width into the widening width of the scanning device FOV 447. In so doing, the one or more lenses, mirrors, mechanical irises and/or other optical elements of the optics component 400, individually and/or in cooperation with each other and/or with the image sensor 500, define various cardinal points (e.g., focal points, nodal points, principal points). As depicted, among such cardinal points is a cardinal point 446 that is positioned along an optics component axis 449 of the optics component 400, and from which the scanning device FOV 447 extends. In extending from the cardinal point 446, the scanning device FOV 447 extends along the optics component axis 449 through an optics component image plane 448 of the optics component 400 before reaching the transparent portion 204 of the lighting cone 200.

Turning more specifically to FIGS. 3A and 3H, with the optics component 400 and the image sensor 500 positioned relative to each other as has been described, at least the axes 449 and 559 may align such that they become a single axis 449, 559, and such that the image planes 448 and 558 are caused to extend in parallel to each other. At least as a result of such relative positioning of the optics component 400 and the image sensor 500, the scanning device optical axis 669 along which the scanning device FOV 447 extends may be defined by this aligned combination of the axes 449 and 559 such that all three of the axes 449, 559 and 669 become a single axis 449, 559, 669. Further, with the optics component 400 and the image sensor 500 positioned together within the scanner head portion 101 as has been described, the axes 449, 559 and 669 extend at least in parallel with the scanner head axis 119, and it may be that the axes 449, 559 and 669 align with the scanner head axis 119 such that all four of the axes 119, 449, 559 and 669 become a single axis 119, 449, 559, 669. More precisely, with the optics component 400 and the image sensor 500 aligned as just described, the position and orientation of the scanning device optical axis 669 may be defined as a line that passes through the center of the imaging sensing portion of the image sensor 500 (e.g., through the center of a 2D grid of photo detectors of the image sensor 500) and through the center of a pupil defined by one or more lenses, mirrors, mechanical irises and/or other optical elements within the optical component 400.

As depicted, the transparent portion 204 may be oriented to extend perpendicular to the scanning device optical axis 669. Also, the shape and/or size of the transparent portion 204 may be selected to closely match the shape and/or size of the scanning device FOV 447. Additionally, the transparent portion 204 may be vertically centered along the scanning device optical axis 669 such that it extends vertically both above and below the scanning device optical axis 669 by an equal distance $h_{window}$.

FIG. 4 depicts aspects of two example illumination issues that may be encountered in using the PRIOR ART portable scanning device 1000 to scan the encoded indicia 775 when the portion of the surface 771 on which it is directly carried is positioned along the scanner head axis 119 and the scanning device optical axis 669 (which, as discussed above, are at least parallel to each other, if not one and the same axis), and in an orientation that is perpendicular to both axes 119 and 669. As those skilled in the art will readily recognize, the placement of scanning components within the scanner head portion 101 that has been described above defines many aspects of an illumination geometry used to illuminate the portion of the surface 771 of the object 700 onto which the encoded indicia 775 has been directly marked. The position and orientation of that portion of the surface 771 relative to the scanning device 1000 serve to complete the definition of that illumination geometry.

Figure 4B:
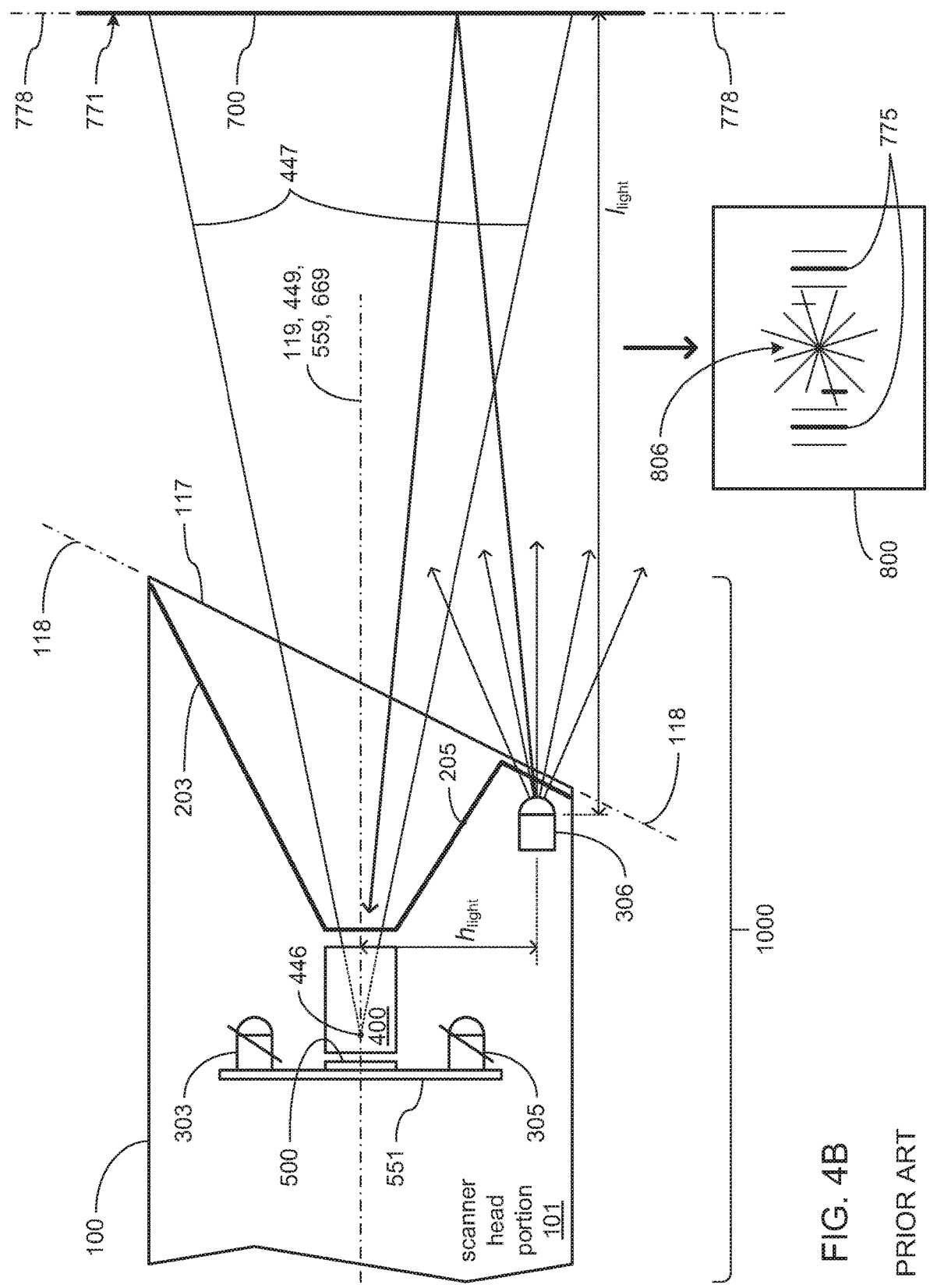

Between FIGS. 4A and 4B, the illumination geometry that is depicted in each differs in the distance at which the portion of the surface 771 that directly carries the encoded indicia is positioned from the nose end 117 along the scanner head axis 119 and the scanning device optical axis 669. However, as previously discussed, the distance of that portion of the surface 771 from the nose end 117 may necessitate a change in which ones of the light sources 303, 305 and/or 306 are relied upon to provide the source(s) of illumination. Thus, illumination geometry also differs between FIG. 4A in which that portion of the surface 771 is close enough to touch or almost touch a portion of the nose end 117 as to enable the use of diffuse lighting from the light sources 303 and 305, and FIG. 4B in which that portion of the surface 771 is far enough away as to make the diffuse lighting from the light sources 303 and 305 ineffective to an extent that necessitates the use of non-diffuse lighting from the light source 306.

Turning more specifically to FIG. 4A, with the portion of the surface 771 of the object 700 that directly carries the encoded indicia 775 positioned close enough along the scanner head axis 119 and the scanning device optical axis 669 to be in contact with (or almost in contact with) a portion of the nose end 117, with that portion of the surface 771 oriented to be perpendicular to both axes 119 and 669, with the non-diffuse light source 306 sufficiently vertically offset by $h_{light}$ from the optics component axis 449, and with the non-diffuse light source 306 at a relatively close distance ($l_{light}$) to that portion of the surface 771, the diffuse lighting provided by the light sources 303 and 305 through the diffusion portions 203 and 205, respectively, of the lighting cone 200 becomes the dominant source of illumination for that portion of the surface 771.

Unfortunately, such close proximity of that portion of the surface 771 to the nose end 117 interacts with the location of the transparent portion 204 between the diffusion portions 203 and 205 in such a manner as to form a region of reduced illumination on that portion of the surface 771 at the center of the scanning device FOV 447. As a result, an image 800 captured by the image sensor 500 of that portion of the surface 771 is caused to include a shadow region 804 of reduced illumination at the center of the image 800. As depicted, where the operator of the prior scanning device 1000 has been successful in properly operating the scanning device 1000 to the extent of causing the encoded indicia 775 to also appear in the center of the image 800, a portion of the encoded indicia 775 may be obscured by the shadow region 804 to an extent that prevents the encoded indicia 775 from being successfully decoded.

Turning more specifically to FIG. 4B, with the portion of the surface 771 of the object 700 that directly carries the encoded indicia 775 positioned far enough away along the scanner head axis 119 and the scanning device optical axis 669 that the diffuse light provided by the light sources 303 and 305 through the diffusion portions 203 and 205, respectively, of the lighting cone 200 cannot provide sufficient illumination to support the capturing of images, and with that portion of the surface 771 oriented to be perpendicular to the both axes 119 and 669, the non-diffuse lighting provided by the light source 306 through the transparent portion 206 of the lighting cone 200 (and from a relatively long distance $l_{light}$ away) becomes the dominant source of illumination for that portion of the surface 771.

Unfortunately, such a lengthy distance of that portion of the surface 771 from the nose end 117 interacts with the location of the light source 306 in such a manner as to enable a direct reflection of that non-diffuse light from the light source 306, on that portion of the surface 771, and toward the image sensor 500 within the scanning device FOV 447. In particular, this may occur when the surface 771 has optically reflective properties and/or is given a specular surface finish, such as a polished metal surface or other material with a mirror-like surface. As a result, an image 800 captured by the image sensor 500 of that portion of the surface is caused to include a blind region 806 of excessive illumination that fills at least a portion of the captured image 800, if not the entirety of the captured image 800. As those skilled in the art will readily recognize, depending on the intensity of the directly reflected non-diffuse light, the reflectivity of that portion of the surface 771 and/or the distance of that portion of the surface 771 from the nose end 117, it may be possible to actually damage image sensor 500 with such a direct reflection of non-diffuse light.

Figure 5A:
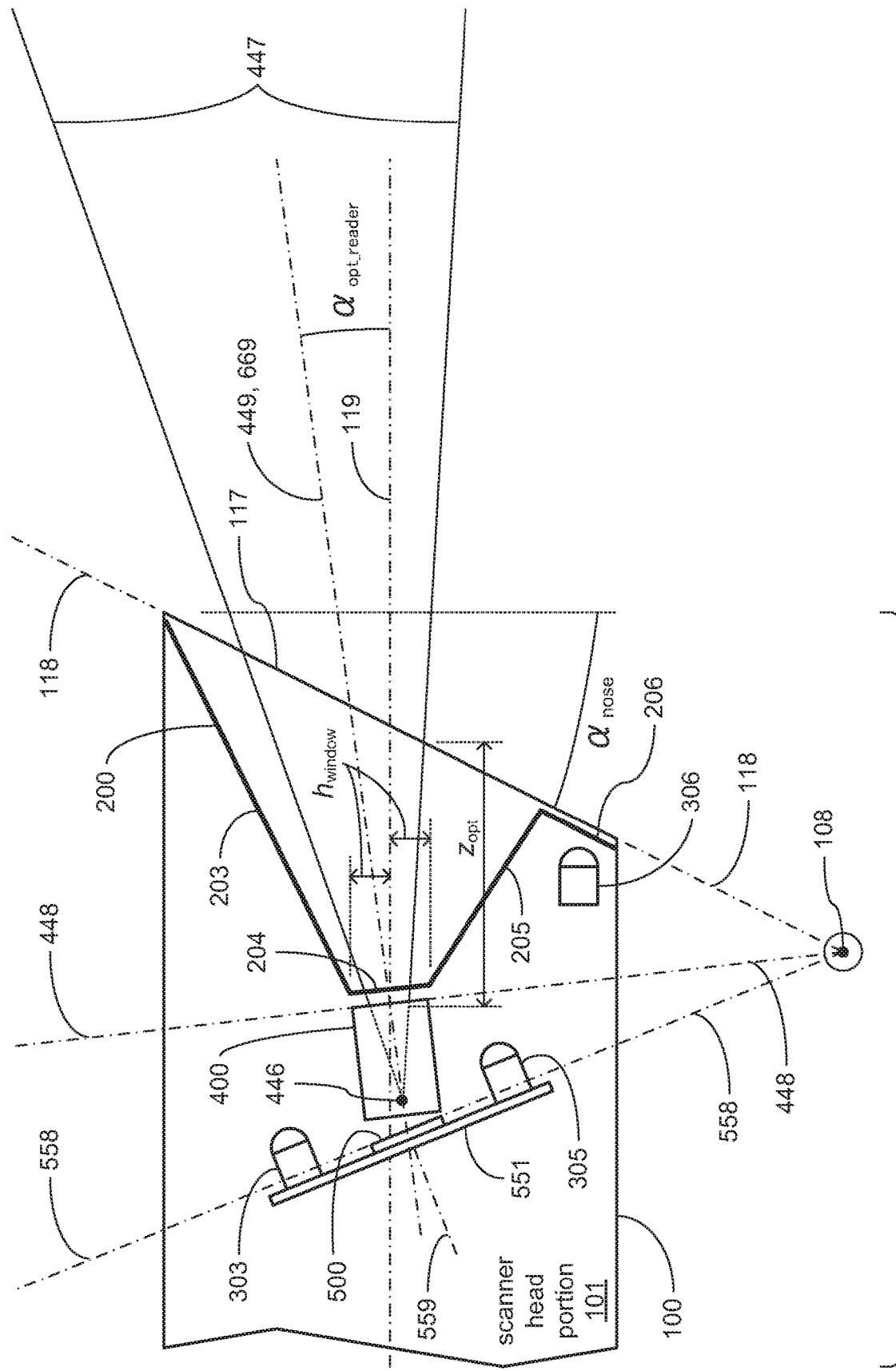
FIGS. 5A and 5B, collectively referred to herein as FIG. 5, show aspects of an example novel embodiment of a portable scanning device.
Figure 5B:
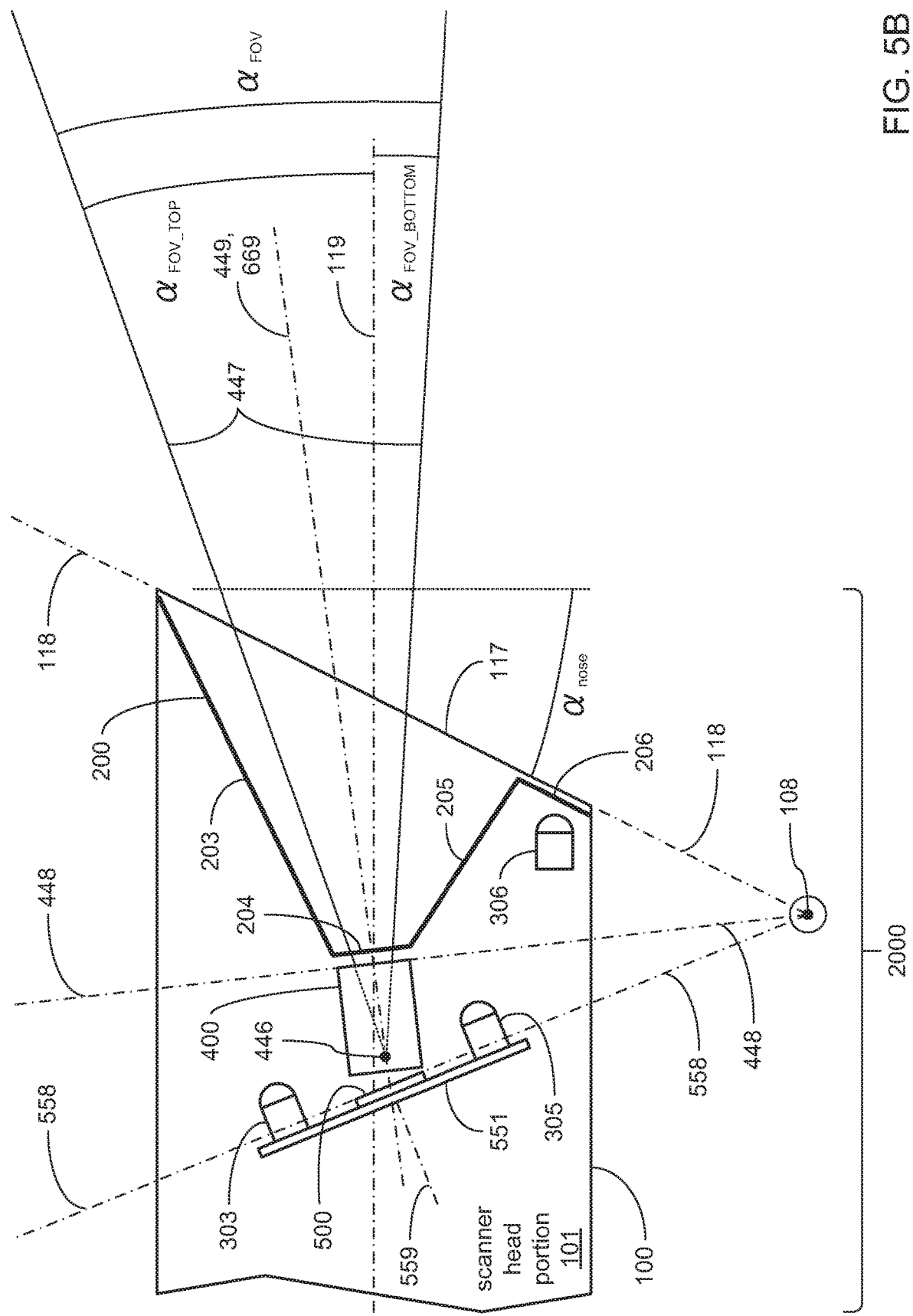

FIG. 5 depicts aspects of an example embodiment of a novel portable scanning device 2000 that overcomes the shortcomings of the aforedescribed PRIOR ART portable scanning device 1000 set forth in FIGS. 1-4. It should be noted that FIGS. 5A and 5B are identical views of the very same example embodiment of the novel portable scanning device 2000, but with different dimensional and angular measures depicted and labeled—not a single feature or component of the depicted example embodiment of the scanning device 2000 is different between these FIGS. 5A and 5B. These two identical views of the very same embodiment are provided as an alternative to attempting to depict and label all of the various dimensional and angular measures within a single figure, which Applicant believes would be too visually cluttered to be appropriately understandable.

Therefore, referring to both FIGS. 5A and 5B, in the depicted example embodiment of the novel portable scanning device 2000, the positions both of the optics component 400 and the image sensor 500 are vertically tilted within the scanner head portion 101 from the positions of each within the scanner head portion 101 of the PRIOR ART portable scanning device 1000 of FIGS. 1-4. With this vertical tilting of the optics component 400 and of the image sensor 500, both the optics component axis 449 and the image sensor axis 559 are also vertically rotated such that neither extend parallel to, or are aligned with, either the scanner head axis 119. Additionally, with this vertical rotation of the optics component axis 449 and the image sensor axis 559, the scanning device optical axis 669 is also vertically rotated such that it also does not extend parallel to, or in alignment with, the scanner head axis 119. As a result, in the depicted example embodiment of the novel portable scanning device 2000, and unlike in the PRIOR ART portable scanning device 1000, the scanning device FOV 447 extends from the cardinal point 446 along the scanning device optical axis 669 in a direction that is tilted away from the direction in which the scanner head axis 119 extends by an angle $\alpha_{opt\_reader}$ (shown in FIG. 5A).

More specifically, the direction in which the optics component 400 and the image sensor 500 are tilted is selected to cause the optics component axis 449 and the image sensor axis 559 to be tilted out of alignment with the scanner head axis 119 in a direction that causes the scanning device optical axis 669 to also be tilted out of alignment with the scanner head axis 119 in a direction that causes, in turn, the scanning device FOV 447 to be rotated in a direction away from the light source 306. It should be noted that, although many of the figures herein, including FIG. 5, depict a broken away portion of the scanner head portion 101 in a side elevation that is oriented to correspond to earlier-discussed upright orientation of the PRIOR ART scanning device 1000 with the light source 306 positioned at an elevation below the optics component 400 and the image sensor 500 (and accordingly, below the axes 119, 449, 559 and 669), other embodiments of the novel portable scanning device 2000 are possible in which the light source 306 may be positioned at an elevation above or to the side of those optical components. In such other embodiments, the optics component 400 and the image sensor 500 may be tilted in a different selected direction that causes the axes 449, 559 and 669 to be tilted out of alignment with the scanner head axis 119 in a different direction that still causes the scanning device FOV 447 to be rotated in a direction away from the light source 306.

As previously discussed in reference to the PRIOR ART portable scanning device 1000, the image sensor 500 may be indirectly mounted within the scanner head portion 101 by being soldered to the support circuitboard 551, which may in turn be mounted within the scanner head portion 101. Thus, in the depicted example embodiment of the novel portable scanning device 2000, the image sensor 500 (and accordingly, its associated image sensor image plane 558 and image sensor axis 559) may be tilted as a result of the mounting of the support circuitboard 551 in the depicted titled orientation. Additionally, and as also depicted, with such tilting of the support circuitboard 551, the light sources 303 and 305, which may be carried by the support circuitboard 551 along with the image sensor 500, may also become similarly tilted within the scanner head portion 101.

As also depicted in both FIGS. 5A and 5B, in the depicted example embodiment of the novel portable scanning device 2000, the optics component 400 may be tilted to a different degree than the image sensor 500 as part of forming part of a Scheimpflug configuration that is completed on occasions when a portion of the surface 771 of the object 700 is positioned against the nose end 117 so as to extend closely alongside and parallel to the nose end image plane 118. More precisely, each of the optics component 400 and the image sensor 500 are tilted to differing degrees that are selected to cause the optics component image plane 448 and the image sensor image plane 558, respectively, to both intersect the nose end image plane 118 along a single Scheimpflug line 108 (depicted as extending into and out of the plane of the FIGS. 5A and 5B). As will be familiar to those skilled in the art, such an alignment among image planes in accordance with the Scheimpflug principle may be deemed desirable to minimize distortion and/or focusing issues in a situation in which the image plane in which an object extends in a different orientation than the image plane of the image sensor or film used to capture an image of that object.

It should be noted that, in the depiction of the novel portable scanning device 2000, an assumption is made that the set of one or more lenses, mirrors, mechanical irises and/or other optical elements within the optics component 400 cooperate in a manner that defines the scanning device optical axis 669 as aligned with and extending along the optics component axis 449 such that they are one and the same axis 449, 669. This assumption is based, in turn, on an assumption that the scanning device optical axis 669 can be so defined without regard to the differences in tilt between the optics component 400 and the image sensor 500 that cause the optics component axis 449 and the image sensor axis 559 to not be in parallel. Thus, based on this assumption, and as depicted in FIGS. 5A and 5B, the degree of rotation of the scanning device optical axis 669 out of alignment with the scanner head axis 119 is defined solely by the degree of rotation of the optics component axis 449 out of alignment with the scanner head axis 119. However, it should also be noted that other embodiments of the novel portable scanning device 2000 are possible in which the set of one or more lenses, mirrors, mechanical irises and/or other optical elements within the optics component 400 cooperate both among themselves and with the image sensor 500 to define the scanning device optical axis 669. Thus, in such other embodiments, the definition of the scanning device optical axis 669 may be at least somewhat sensitive to and/or responsive to the depicted lack of alignment of the optics component axis 449 and the image sensor axis 559. As a result, while the scanning device optical axis 669, in such other embodiments, may be still be rotated vertically away from the scanner head axis 119, the scanning device optical axis 669 may be rotated away from the scanner head axis 119 by a somewhat lesser degree or a somewhat greater degree than the optics component axis 449.

As further depicted in FIGS. 5A and 5B, the lighting cone 200 of the depicted example embodiment of the novel portable scanning device 2000 may be reshaped and repositioned in comparison to the lighting cone 200 of the PRIOR ART portable scanning device 1000 of FIGS. 1-4 to cause the transparent portion 204 to extend perpendicular to the now rotated scanning device optical axis 669 of the depicted example embodiment of the novel portable scanning device 2000. This may cause some degree of corresponding reshaping and repositioning of the diffusion portions 203 and 205 so as to enable each to continue to extend between the transparent portion 204 and portions of the nose end 117.

Turning more specifically to FIG. 5A, with the transparent portion 204 tilted to extend perpendicular to the now rotated scanning device optical axis 669 of the novel portable scanning device 2000, the vertical distance $h_{window}$ of the transparent portion 204 of the depicted example embodiment of the novel portable scanning device 2000 may differ from the vertical distance $h_{window}$ of the transparent portion 204 of the PRIOR ART portable scanning device 1000. Turning more specifically to FIG. 5B, with the scanning device optical axis 669 rotated vertically such that the scanning device FOV 447 is rotated vertically away as has been discussed, and as is depicted, the angles $\alpha_{FOV\_TOP}$ and $\alpha_{FOV\_BOTTOM}$, are caused to differ between the example embodiment of the novel portable scanning device 2000 and the PRIOR ART portable scanning device 1000, with the angle $\alpha_{FOV\_TOP}$ increasing, and the angle $\alpha_{FOV\_BOTTOM}$ decreasing.

Figure 6:
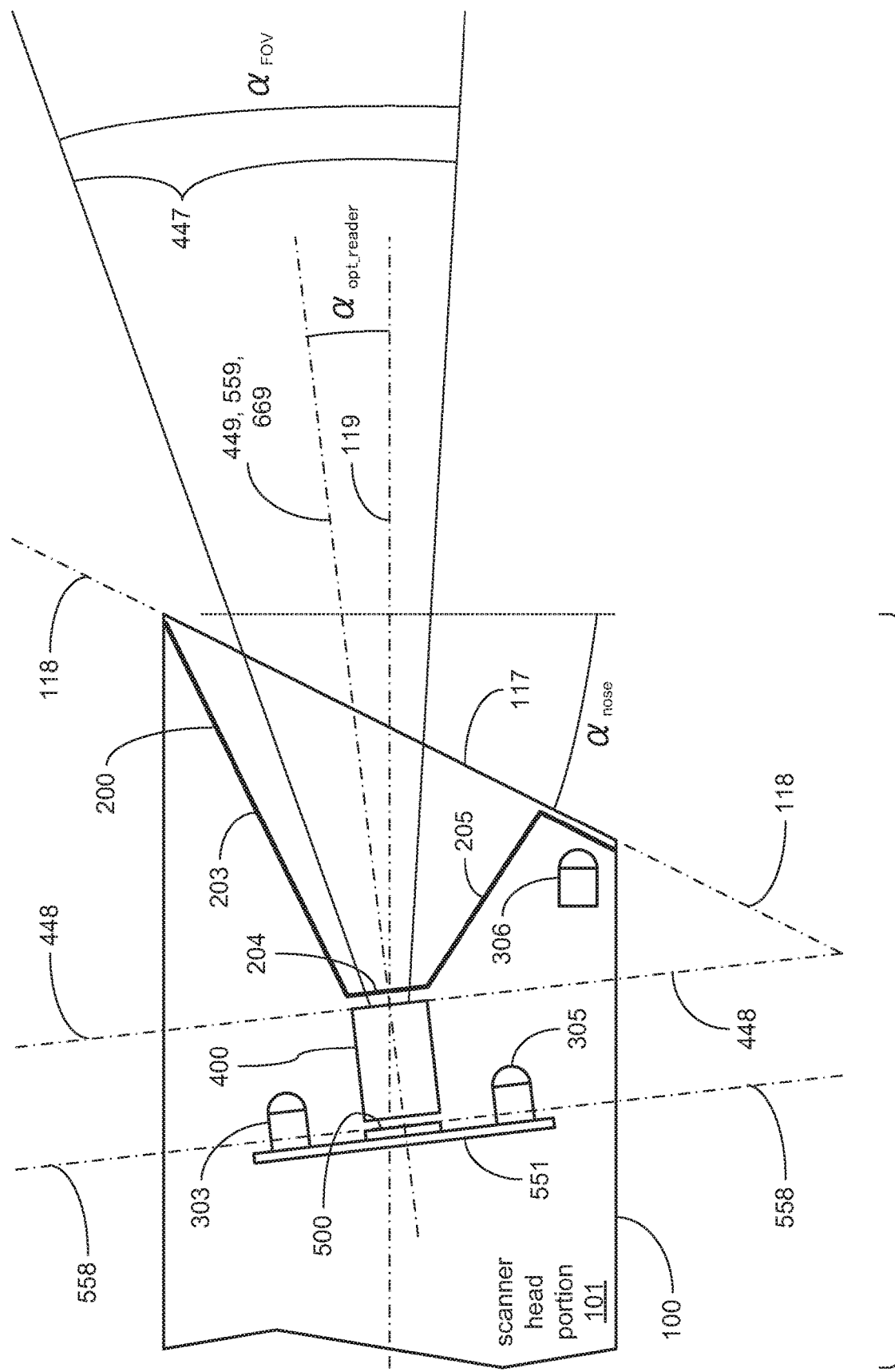
FIG. 6 shows aspects of an example alternate novel embodiment of a portable scanning device.

FIG. 6 depicts aspects of an example alternate embodiment of the novel portable scanning device 2000 that also overcomes the shortcomings of the aforedescribed PRIOR ART portable scanning device 1000 set forth in FIGS. 1-4. Although use of the Scheimpflug configuration of the embodiment of the novel portable scanning device 2000 of FIG. 5 may be deemed desirable, it is not necessary. Therefore, in the alternate embodiment of the novel portable scanning device 2000 of FIG. 6, the optics component 400 and the image sensor 500 are vertically tilted together and to the same degree such that the axes 449 and 559 continue to align (even as both cease to be in parallel with, or to be aligned with, the scanner head axis 119), and such that the image planes 448 and 558 are caused to continue to extend in parallel to each other.

Such tilting of the optics component 400 and the image sensor 500 together within the alternate embodiment of the novel portable scanning device 2000 of FIG. 5 may be deemed desirable where the degree of vertical tilting is relatively slight such that the resulting distortion and/or focusing issues are relatively minimal such that the use of the Scheimpflug configuration is deemed to be unnecessary. Alternatively or additionally, such tilting of the optics component 400 and the image sensor 500 together may be necessitated as a result of optics component 400 and the image sensor 500 being integrated together into a single component.

With the optics component 400 and the image sensor 500 tilted together such that the optics component axis 449 and the image sensor 559 remain aligned such that continue to be one and the same axis 449, 559, the scanning device optical axis 669 may continue to be defined by this aligned combination of the axes 449 and 559 such that the all three of the axes 449, 559 and 669 may continue to be a single axis 449, 559, 669. However, as a result of such tilting, such a single axis 449, 559 and 669 is now rotated out of alignment with the scanner head axis 119.

FIG. 7 depicts aspects of solutions provided by the embodiment of the novel portable scanning device 2000 of FIG. 5 to the two example illumination issues depicted in FIG. 4 as being encountered by the PRIOR ART portable scanning device 1000 of FIGS. 1-4. As previously discussed, the placement of scanning components within the scanner head portion 101 defines many aspects of an illumination geometry used to illuminate the portion of the surface 771 of the object 700 onto which the encoded indicia 775 has been directly marked, and the position and orientation of that portion of the surface 771 serve to complete the definition of that illumination geometry. With the tilting of at least the image sensor 500 in the embodiment of the novel portable scanning device 2000 previously discussed and depicted in FIG. 5, the illumination geometry changes significantly from that of the PRIOR ART portable scanning device 1000 of FIGS. 1-4.

Figure 7A:
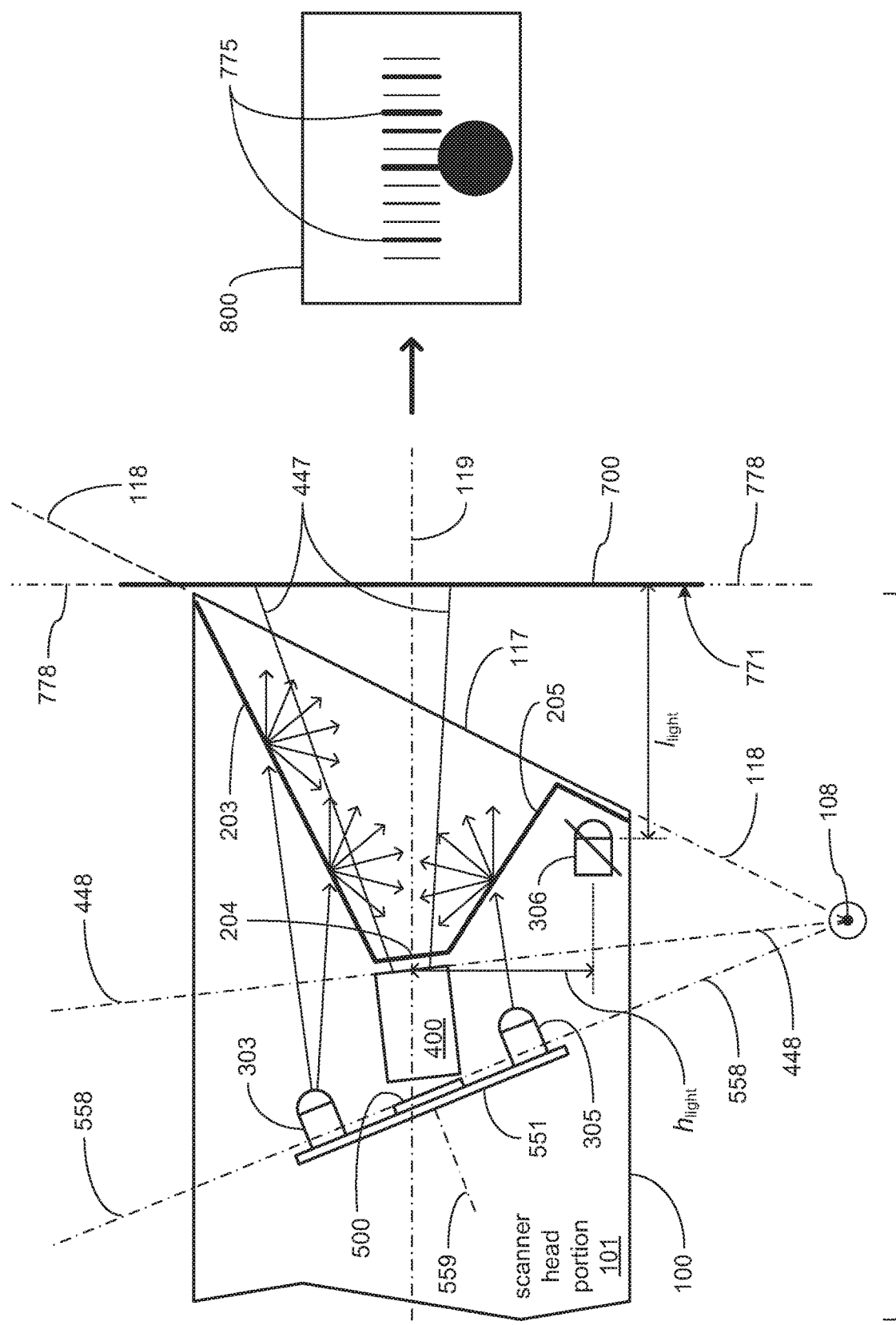
FIGS. 7A and 7B, collectively referred to herein as FIG. 7, show aspects of the operation of the novel scanning device of FIG. 5.
Figure 7B:
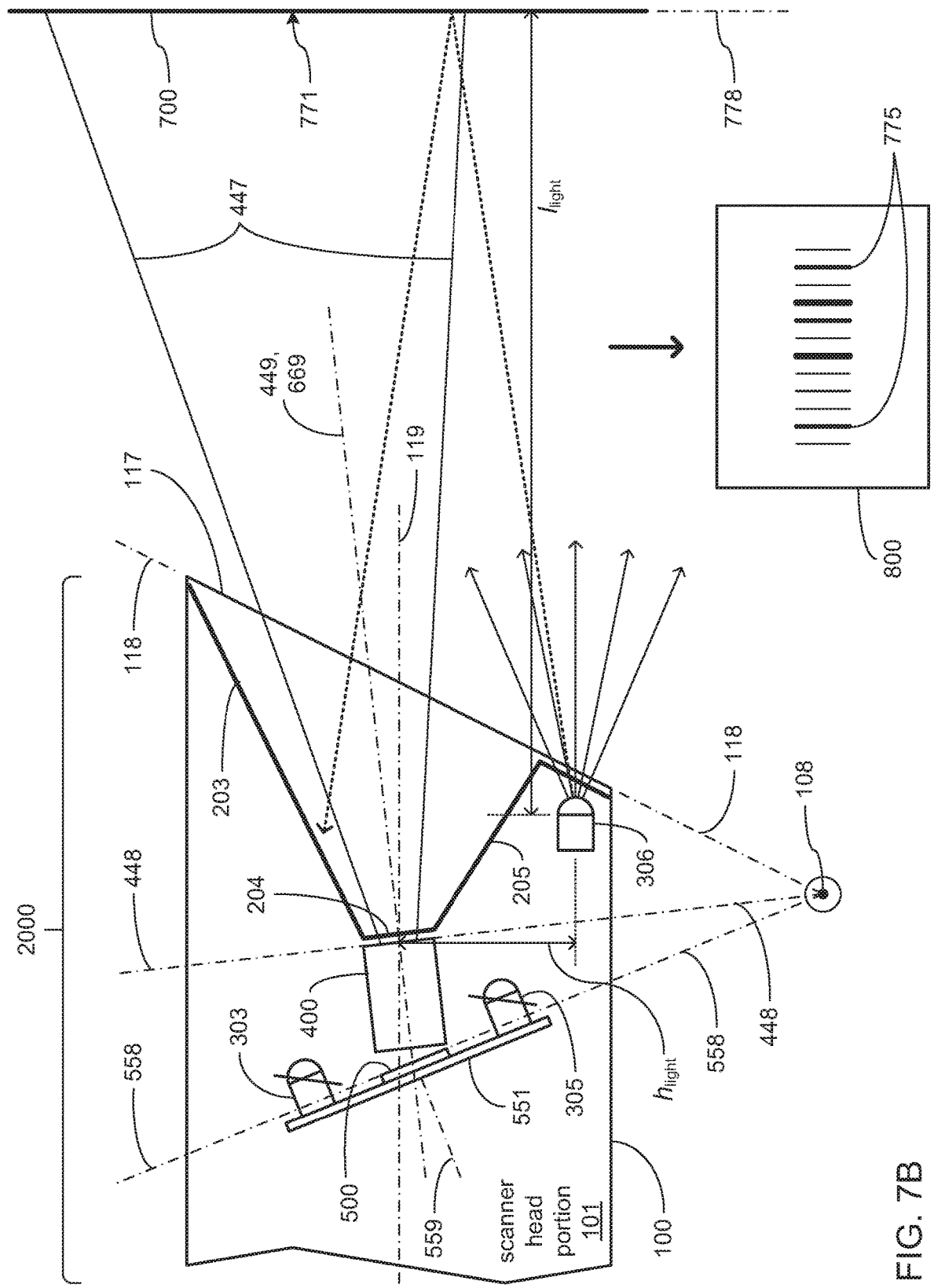

As was the case between FIGS. 4A and 4B, the illumination geometry that is depicted in FIGS. 7A and 7B differs in the distance at which the portion of the surface 771 that directly carries the encoded indicia is positioned from the nose end 117 along the scanner head axis 119 and the scanning device optical axis 669. Indeed, FIG. 7A depicts the same distance of that surface 771 from the nose end 117 as FIG. 4A, and FIG. 7B depicts the same distance of that surface 771 from the nose end 117 as FIG. 4B. As also previously discussed, the distance of that portion of the surface 771 from the nose end 117 may necessitate a change in which ones of the light sources 303, 305 and/or 306 are relied upon to provide the source(s) of illumination. Thus, as was the case between FIGS. 4A and 4B, the illumination geometry also differs between FIG. 7A in which that portion of the surface 771 is close enough to touch (or almost touch) a portion of the nose end 117 as to enable the use of diffuse lighting from the light sources 303 and 305, and FIG. 7B in which that portion of the surface 771 is far enough away as to make the diffuse lighting from the light sources 303 and 305 ineffective to an extent that necessitates the use of non-diffuse lighting from the light source 306.

Turning more specifically to FIG. 7A, and just as was the case in FIG. 4A, with the portion of the surface 771 of the object 700 that directly carries the encoded indicia 775 positioned close enough along the scanner head axis 119 and the scanning device optical axis 669 to be in contact with (or almost in contact with) a portion of the nose end 117, with that portion of the surface 771 oriented to be perpendicular to the scanner head axis 119, with the non-diffuse light source 306 sufficiently vertically offset by $h_{light}$ from where the optics component axis 449 emerges from the optics component 400 (i.e., at the intersection of the optics component image plane 448 and the optics component axis 449), and with the non-diffuse light source 306 at a relatively close distance $l_{light}$ to the that portion of the surface 771, the diffuse lighting provided by the light sources 303 and 305 through the diffusion portions 203 and 205, respectively, of the lighting cone 200 becomes the dominant source of illumination for that portion of the surface 771.

Like the results depicted in FIG. 4A, in FIG. 7A, such close proximity of that portion of the surface 771 to the nose end 117 interacts with the location of the transparent portion 204 between the diffusion portions 203 and 205 in such a manner as to form a region of reduced illumination on that portion of the surface 771 within the scanning device FOV 447, thereby causing a shadow region 804 of reduced illumination to be included in an image 800 captured by the image sensor 500 of that portion of the surface 771. However, unlike the results depicted in FIG. 4A, in FIG. 7A, the rotating of the scanning device optical axis 669 relative to the scanner head axis 119 by the angle $\alpha_{opt\_reader}$ (see FIG. 5A) causes scanning device FOV 477 (which extends along the scanning device optical axis 669) to be similarly rotated relative to the scanner head axis 119. As a result, the region of reduced illumination on that portion of the surface 771 within the scanning device FOV 477 is caused to be shifted out of the center of the scanning device FOV 477 and toward an edge thereof. Thus, and also unlike the results depicted in FIG. 4A, in FIG. 7A, the shadow region 804 is caused to be shifted out of the center of the captured image 800 and toward an edge thereof such that the image of the encoded indicia 775 at the center of the captured image 800 is no longer obscured by the shadow region 804.

The angle $\alpha_{opt\_reader}$ may be derivable using the formula:

$$\alpha_{nose} = \left(\frac{\alpha_{FOV}}{2} - \alpha_{opt\_reader}\right) + \frac{1}{2}\left(\frac{\tan\left(\frac{\alpha_{FOV}}{2} - \alpha_{opt\_reader}\right)z_{opt} + h_{window}}{z_{opt}}\right)$$

Below is a table of various example derived values for $\alpha_{opt\_reader}$. It should be noted that negative values for $\alpha_{opt\_reader}$ are indicative of situations in which the optical component 400 and the image sensor 500 are able to be tilted in a direction that causes the scanning device optical axis 669 to be tilted in a direction toward the light source 306 (rather than away from the light source 306 as has been discussed and depicted), thereby resulting in the scanning device FOV 447 also being tilted toward the light source 306.

and the scanning device optical axis 669 that the diffuse light provided by the light sources 303 and 305 through the diffusion portions 203 and 205, respectively, of the lighting cone 200 cannot provide sufficient illumination to support the capturing of images, and with that portion of the surface 771 oriented to be perpendicular to the scanner head axis 119, the non-diffuse lighting provided by the light source 306 through the transparent portion 206 of the lighting cone 200 (and from a relatively long distance $l_{light}$ away) becomes the dominant source of illumination for that portion of the surface 771.

Unlike the results depicted in FIG. 4B, in FIG. 7B, the tilting of the scanning device optical axis 669 relative to the scanner head axis 119, and the corresponding tilting of the scanning device FOV 447 relative to the scanner head axis 119, causes it to become geometrically impossible to have a direct reflection of the non-diffuse light of the light source 306 on the surface 771 of the object 700 at a location that falls within the scanning device FOV 447. Thus, and also unlike the results depicted in FIG. 4B, in FIG. 7B, an image 800 captured of the portion of the surface 771 of the object 700 that falls within the scanning device FOV 447 remains free of the blind region 806 that was present in the captured image 800 of FIG. 4B such that the image of the encoded indicia 775 within the captured image 800 of FIG. 7B is no longer obscured by the blind region 806.

The angle $\alpha_{FOV\_BOTTOM}$ of the scanning device FOV 447 that results from such tilting of the scanning device FOV 447 may be derivable using the formula:

$$\alpha_{FOV\_BOTTOM} \leq 2 * \left(\arctan\left(\frac{h_{light}}{2*l}\right)\right)$$

There is thus disclosed a scanning device.

A scanning device configured to scan an indicia carried on a surface of an object includes a scanner head that includes: an elongate upper housing portion that defines a scanner head axis, and that includes a nose end through which the scanner head axis extends; an image sensor carried within the upper housing portion, and configured to capture an image of the indicia; an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV; and a longer distance light source carried by the upper housing portion, and configured to illuminate the surface of the object at a relatively long distance with non-diffuse light. The scanning device optical axis is tilted

| $\alpha_{FOV}$ | | | | | | | 30 | | | | | |
|---|---|---|---|---|---|---|---|---|---|---|---|---|
| $Z_{opt}$ | 40 | 30 | 20 | 10 | 40 | 30 | 20 | 10 | 40 | 30 | 20 | 10 |
| $h_{window}$ | | | | | | | 16 | | | | | |
| $\alpha_{nose}$ | | | 20 | | | | 10 | | | | 0 | |
| $\alpha_{opt\_reader}$ | −4.7 | −4.6 | −4.4 | −4.1 | 5.2 | 5.3 | 5.5 | 5.8 | 15.1 | 15.3 | 15.5 | 15.8 |

Turning more specifically to FIG. 7B, and just as was the case in FIG. 4B, with the portion of the surface 771 of the object 700 that directly carries the encoded indicia 775 positioned far enough away along the scanner head axis 119 relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

The scanning device optical axis may be vertically tilted relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV when a plane of a portion of the surface of the object that falls within the scanning device FOV is oriented to be perpendicular to the scanner head axis.

The nose end of the upper housing may define a scanner head image plane through which the scanner head axis extends; the optics component may define an optics component image plane through the scanner head axis extends; the image sensor may define an image sensor image plane through which the scanner head axis extends; and the image sensor and the optics component may each be tilted within the upper housing portion and relative to the scanner head axis to cause all three of the scanner head image plane, the optics component image plane and the image sensor image plane to intersect along a single line that defines a Scheimpflug intersection.

The optics component may be selected from a group consisting of: a lens, a liquid lens, a mechanical iris, and a mirror.

The scanning device may include an elongate lower housing portion that includes a top end connected to a bottom surface of the upper housing portion, and that extends away from the bottom surface to give the scanning device an overall gun-like physical configuration that tends to encourage an operator to hold the scanning device by gripping the lower housing portion with a hand in a gun-like manner that tends to cause the scanning device to be oriented, while being so held by the operator, to position the upper housing portion above the lower housing portion and the hand, and to cause the scanner head axis to extend horizontally through the upper housing portion and over the lower housing portion and the hand. With the scanning device so held by the operator, the longer distance light source may be carried by the housing at a vertical elevation below the image sensor and the optics component. With the scanning device so held by the operator, the tilt of the scanning device optical axis may include a vertically upward tilt that causes the direction in which the scanning device FOV extends from the optics component to also tilt vertically upward such that an angle between a highest extent of a vertical angle of view of the scanning device FOV and the scanner head axis ($\alpha_{FOV\_TOP}$) is greater than an angle between a lowest extent of a vertical angle of view of the scanning FOV and the scanner head axis ($\alpha_{FOV\_BOTTOM}$).

$\alpha_{FOV\_BOTTOM}$ may be derived by the equation:

$$\alpha_{FOV\_BOTTOM} \leq 2(\arctan(h_{light}/2l_{light})).$$

$h_{light}$ may be a vertical distance between the longer distance light source and an intersection of the optics component image plane and an optics component axis of the optics component, and $l_{light}$ may be a horizontal distance between the longer distance light source and the surface of the portion of the object that falls within the scanning device FOV.

The scanning device may further include: a lighting cone having a relatively narrow end and a relatively wide end, that includes a conically shaped side wall that extends between and circumferentially about the relatively narrow end and the relatively wide end, and that is configured to diffuse light that passes through the side wall, wherein: the lighting cone is carried within the upper housing portion with the relatively narrow end adjacent the optics component and the relatively wide end adjacent the nose end of the upper housing portion; and the lighting cone is oriented within the upper housing portion to enable the scanning device FOV to extend through the lighting cone from the optics component adjacent the relatively narrow end and through the nose end of the upper housing portion adjacent the relatively wide end. The scanning device may further include at least one shorter distance light source carried within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object.

The lighting cone may include a narrow end wall that closes the relatively narrow end of the lighting cone, and is configured to be optically clear to enable the light reflected from the portion of the surface of the object that falls within the scanning device FOV to pass through the narrow end wall to reach the optics component. The surrounding of the narrow end wall by the side wall, and the diffusion of light emanating from the at least one shorter distance light source by the side wall may cause the portion of the surface of the object that falls within scanning device FOV to be unevenly illuminated in a manner that defines a shadow region of lesser illumination on the portion of the surface of the object that falls within the scanning device FOV. The degree to which the scanning device optical axis is tilted may be selected to cause the shadow region to be shifted away from a center of the scanning device FOV and toward an edge of the scanning device FOV.

A method for minimizing blindness of a scanning device configured to scan an indicia carried on a surface of an object includes: forming a housing of the scanning device to comprise an elongate upper housing portion that defines a scanner head axis; forming the upper housing to include a nose end through which the scanner head axis extends and is configured to be pointed toward the object during the scan of the indicia; positioning an image sensor configured to capture an image of the indicia within the upper housing portion; positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV; incorporating, into the upper housing portion, a longer distance light source configured to illuminate the surface of the object at a relatively long distance with non-diffuse light; and tilting the scanning device optical axis relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

The optics component may define an optics component image plane through the scanner head axis extends, the image sensor may define an image sensor image plane through which the scanner head axis extends, and the method may include: forming the nose end of the upper housing to define a scanner head image plane through which the scanner head axis extends; and tilting each of the image sensor and optics component within the upper housing portion to cause all three of the scanner head image plane, the optics component image plane and the image sensor image plane to intersect along a single line that defines a Scheimpflug intersection.

The method may include positioning a lighting cone having a relatively narrow end and a relatively wide end within the upper housing portion with the relatively narrow end adjacent the optics component and the relatively wide end adjacent the nose end of the upper housing portion, wherein: the lighting cone comprises a conically shaped side wall that extends between and circumferentially about the relatively narrow end and the relatively wide end, and that is configured to diffuse light that passes through the side wall; and the lighting cone is oriented within the upper housing portion to enable the scanning device FOV to extend through the lighting cone from the optics component adjacent the relatively narrow end and through the nose end of the upper housing portion adjacent the relatively wide end. The method may include positioning at least one shorter distance light source within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object.

The method may include forming the lighting cone to comprises a narrow end wall that closes the relatively narrow end of the lighting cone, and is configured to be optically clear to enable the light reflected from the portion of the surface of the object that falls within the scanning device FOV to pass through the narrow end wall to reach the optics component, wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV. The method may include selecting at least the degree to which the scanning device optical axis is tilted to cause a shadow region to be shifted away from a center of the scanning device FOV and toward an edge of the scanning device FOV.

A scanning device configured to scan an indicia carried on a surface of an object includes: an elongate upper housing portion that defines a scanner head axis, and that includes a nose end through which the scanner head axis extends; an image sensor carried within the upper housing portion, and configured to capture an image of the indicia; and an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor. The scanning device also includes a lighting cone through which the light reflected passes from a relatively wide end of the lighting cone adjacent the nose end and to having a relatively narrow end of the lighting cone adjacent the optics component, the lighting cone including: a conically shaped side wall that extends between and circumferentially about the relatively narrow end and the relatively wide end, and that is configured to diffuse light that passes through the side wall; and a narrow end wall that closes the relatively narrow end, and is configured to be optically clear to enable the reflected light to pass through the narrow end wall to reach the optics component. The scanning device further includes: at least one shorter distance light source carried within the upper housing portion at a location external to the lighting cone with the side wall interposed between the at least one shorter distance light source and the nose end to cause light emanating from the at least one short distance light source to be made diffuse by the side wall before reaching the surface of the object; wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and wherein the scanning device optical axis is tilted relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

The scanning device optical axis may be vertically tilted relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV when a plane of a portion of the surface of the object that falls within the scanning device FOV is oriented to be perpendicular to the scanner head axis.

The nose end of the upper housing may define a scanner head image plane through which the scanner head axis extends; the optics component may define an optics component image plane through the scanner head axis extends; the image sensor may define an image sensor image plane through which the scanner head axis extends; and the image sensor and the optics component may be each tilted within the upper housing portion and relative to the scanner head axis to cause all three of the scanner head image plane, the optics component image plane and the image sensor image plane to intersect along a single line that defines a Scheimpflug intersection.

The optics component may be selected from a group consisting of: a lens, a liquid lens, a mechanical iris, and a mirror.

The degree to which the scanner head image plane is tilted may be selected to cause the shadow region to be shifted away from the center of the scanning device FOV and toward the edge of the scanning device FOV when a plane of a portion of the surface of the object that falls within the scanning device FOV is oriented either to be perpendicular to the scanner head axis or to be parallel with scanner head image plane.

The scanning device may include an elongate lower housing portion that includes a top end connected to a bottom surface of the upper housing portion, and that extends away from the bottom surface to give the scanning device an overall gun-like physical configuration that tends to encourage an operator to hold the scanning device by gripping the lower housing portion with a hand in a gun-like manner that tends to cause the scanning device to be oriented, while being so held by the operator, to position the upper housing portion above the lower housing portion and the hand, and to cause the scanner head axis to extend horizontally through the upper housing portion and over the lower housing portion and the hand. With the scanning device so held by the operator, the longer distance light source may be carried by the housing at a vertical elevation below the image sensor and the optics component. With the scanning device so held by the operator, the tilt of the scanning device optical axis may include a vertically upward tilt that causes the direction in which the scanning device FOV extends from the optics component to also tilt vertically upward such that an angle between a highest extent of a vertical angle of view of the scanning device FOV and the scanner head axis ($\alpha_{FOV\_TOP}$) is greater than an angle between a lowest extent of a vertical angle of view of the scanning FOV and the scanner head axis ($\alpha_{FOV\_BOTTOM}$). $\alpha_{FOV\_BOTTOM}$ may be derived by the equation:

$$\alpha_{FOV\_BOTTOM} \leq 2(\arctan(h_{light}/2l_{light})).$$

$h_{light}$ may be a vertical distance between the longer distance light source and an intersection of the optics component image plane and an optics component axis of the optics component, and $l_{light}$ may be a horizontal distance between the longer distance light source and the surface of the portion of the object that falls within the scanning device FOV.

The diffusion of the light emanating from the at least one shorter distance light source by the side wall may weaken the light emanating from the at least one shorter light source to an extent that prevents effective illumination of the surface of the object by the at least one shorter distance light source to enable a scan of the indicia unless the surface of the object is positioned relatively close to, or in contact with, the nose end. The scanning device may include a longer distance light source carried by the upper housing portion, and configured to illuminate the surface of the object effectively enough to enable a scan of the indicia when the surface of the object is positioned at least far enough away from the node end to prevent effective illumination of the surface of the object by the at least one shorter light source. The degree to which the scanning device optical axis is tilted may be selected to prevent the direct reflection of light emanating from the longer distance light source from being included in the scanning device FOV when the surface of the object is positioned at least far enough away from the nose end to prevent effective illumination of the surface of the object by the at least one shorter light source, and with a plane of a portion of the surface of the object that falls within the scanning device FOV oriented to be perpendicular to the scanner head axis.

The lighting cone may include a transparent portion extending outwardly from the circumference of the relatively wide end and into a position within the upper housing portion at which the transparent portion is interposed between the longer distance light source and the nose end to cause light emanating from the longer distance light to pass through the transparent portion to illuminate the surface of the object.

A method for improving the scanning of indicia carried on a surface of an object by a scanning device configured to scan the indicia includes: forming a housing of the scanning device to comprise an elongate upper housing portion that defines a scanner head axis; forming the upper housing to include a nose end through which the scanner head axis extends and is configured to be pointed toward the object during the scan of the indicia; positioning an image sensor configured to capture an image of the indicia within the upper housing portion; and positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV. The method also includes positioning a lighting cone having a relatively narrow end and a relatively wide end within the upper housing portion with the relatively narrow end adjacent the optics component and the relatively wide end adjacent the nose end of the upper housing portion, wherein: the lighting cone comprises a conically shaped side wall that extends between and circumferentially about the relatively narrow end and the relatively wide end, and that is configured to diffuse light that passes through the side wall; and the lighting cone is oriented within the upper housing portion to enable the scanning device FOV to extend through the lighting cone from the optics component adjacent the relatively narrow end and through the nose end of the upper housing portion adjacent the relatively wide end. The method further includes positioning at least one shorter distance light source within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object, wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV. The method still further includes tilting the scanning device optical axis relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

The optics component may define an optics component image plane through the scanner head axis extends; the image sensor may define an image sensor image plane through which the scanner head axis extends; and the method may include: forming the nose end of the upper housing to define a scanner head image plane through which the scanner head axis extends; and tilting each of the image sensor and optics component within the upper housing portion to cause all three of the scanner head image plane, the optics component image plane and the image sensor image plane to intersect along a single line that defines a Scheimpflug intersection.

The method may include selecting the degree to which the scanner head image plane is tilted to cause the shadow region to be shifted away from the center of the scanning device FOV and toward the edge of the scanning device FOV when a plane of a portion of the surface of the object that falls within the scanning device FOV is oriented either to be perpendicular to the scanner head axis or to be parallel with scanner head image plane.

The diffusion of the light emanating from the at least one shorter distance light source by the side wall may weaken the light emanating from the at least one shorter light source to an extent that prevents effective illumination of the surface of the object by the at least one shorter distance light source to enable a scan of the indicia unless the surface of the object is positioned relatively close to, or in contact with, the nose end. The method may include: incorporating, into the upper housing portion, a longer distance light source configured to illuminate the surface of the object effectively enough to enable a scan of the indicia when the surface of the object is positioned at least far enough away from the node end to prevent effective illumination of the surface of the object by the at least one shorter light source; and selecting the degree to which the scanning device optical axis is tilted to prevent the direct reflection of light emanating from the longer distance light source from being included in the scanning device FOV when the surface of the object is positioned at least far enough away from the nose end to prevent effective illumination of the surface of the object by the at least one shorter light source, and with a plane of a portion of the surface of the object that falls within the scanning device FOV oriented to be perpendicular to the scanner head axis.

Various other components may be included and called upon for providing for aspects of the teachings herein. For example, additional materials, combinations of materials, and/or omission of materials may be used to provide for added embodiments that are within the scope of the teachings herein.

Standards for performance, selection of materials, functionality, and other discretionary aspects are to be determined by a user, designer, manufacturer, or other similarly interested party. Any standards expressed herein are merely illustrative and are not limiting of the teachings herein.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the invention has been described with reference to illustrative embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A scanning device configured to scan an indicia carried on a surface of an object, the scanning device comprising a scanner head that comprises:

an elongate upper housing portion that defines a scanner head axis, and that includes a nose end through which the scanner head axis extends;

an image sensor carried within the upper housing portion, and configured to capture an image of the indicia;

an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV;

a longer distance light source carried by the upper housing portion, and configured to illuminate the surface of the object at a relatively long distance with non-diffuse light; and wherein the scanning device optical axis is tilted relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

2. The scanning device of claim 1, wherein the scanning device optical axis is vertically tilted relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV when a plane of a portion of the surface of the object that falls within the scanning device FOV is oriented to be perpendicular to the scanner head axis.

3. The scanning device of claim 1, wherein:

the nose end of the upper housing defines a scanner head image plane through which the scanner head axis extends;

the optics component defines an optics component image plane through the scanner head axis extends;

the image sensor defines an image sensor image plane through which the scanner head axis extends; and the image sensor and the optics component are each tilted within the upper housing portion and relative to the scanner head axis to cause all three of the scanner head image plane, the optics component image plane and the image sensor image plane to intersect along a single line that defines a Scheimpflug intersection.

4. The scanning device of claim 3, wherein the optics component is selected from a group consisting of:

a lens;
a liquid lens;
a mechanical iris; and
a mirror.

5. The scanning device of claim 3, wherein:

the scanning device comprises an elongate lower housing portion that includes a top end connected to a bottom surface of the upper housing portion, and that extends away from the bottom surface to give the scanning device an overall gun-like physical configuration that tends to encourage an operator to hold the scanning device by gripping the lower housing portion with a hand in a gun-like manner that tends to cause the scanning device to be oriented, while being so held by the operator, to position the upper housing portion above the lower housing portion and the hand, and to cause the scanner head axis to extend horizontally through the upper housing portion and over the lower housing portion and the hand;

with the scanning device so held by the operator, the longer distance light source is carried by the housing at a vertical elevation below the image sensor and the optics component; and with the scanning device so held by the operator, the tilt of the scanning device optical axis comprises a vertically upward tilt that causes the direction in which the scanning device FOV extends from the optics component to also tilt vertically upward such that an angle between a highest extent of a vertical angle of view of the scanning device FOV and the scanner head axis ($\alpha_{FOV\_TOP}$) is greater than an angle between a lowest extent of a vertical angle of view of the scanning FOV and the scanner head axis ($\alpha_{FOV\_BOTTOM}$).

6. The scanning device of claim 5, wherein:
$\alpha_{FOV\_BOTTOM}$ is derived by the equation:

$$\alpha_{FOV\_BOTTOM} \leq 2(\arctan(h_{light}/2l_{light}));$$

$h_{light}$ comprises a vertical distance between the longer distance light source and an intersection of the optics component image plane and an optics component axis of the optics component; and $l_{light}$ comprises a horizontal distance between the longer distance light source and the surface of the portion of the object that falls within the scanning device FOV.

7. The scanning device of claim 1, further comprising:
a lighting cone having a relatively narrow end and a relatively wide end, that comprises a conically shaped side wall that extends between and circumferentially about the relatively narrow end and the relatively wide end, and that is configured to diffuse light that passes through the side wall, wherein:
the lighting cone is carried within the upper housing portion with the relatively narrow end adjacent the optics component and the relatively wide end adjacent the nose end of the upper housing portion; and
the lighting cone is oriented within the upper housing portion to enable the scanning device FOV to extend through the lighting cone from the optics component adjacent the relatively narrow end and through the nose end of the upper housing portion adjacent the relatively wide end; and
at least one shorter distance light source carried within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object.

8. The scanning device of claim 7, wherein:
the lighting cone comprises a narrow end wall that closes the relatively narrow end of the lighting cone, and is configured to be optically clear to enable the light reflected from the portion of the surface of the object that falls within the scanning device FOV to pass through the narrow end wall to reach the optics component;
the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and
the degree to which the scanning device optical axis is tilted is selected to cause the shadow region to be shifted away from a center of the scanning device FOV and toward an edge of the scanning device FOV.

9. A method for minimizing blindness of a scanning device configured to scan an indicia carried on a surface of an object, the method comprising:
forming a housing of the scanning device to comprise an elongate upper housing portion that defines a scanner head axis;
forming the upper housing to include a nose end through which the scanner head axis extends and is configured to be pointed toward the object during the scan of the indicia;
positioning an image sensor configured to capture an image of the indicia within the upper housing portion;
positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV;
incorporating, into the upper housing portion, a longer distance light source configured to illuminate the surface of the object at a relatively long distance with non-diffuse light; and
tilting the scanning device optical axis relative to the scanner head axis to cause the scanning device FOV to extend along the scanning device optical axis in a direction that is tilted away from extending in parallel with the scanner head axis to a degree that prevents a direct reflection, from the surface of the object, of light emanating from the longer distance light source from being included in the scanning device FOV.

10. The method of claim 9, wherein:
the optics component defines an optics component image plane through the scanner head axis extends;
the image sensor defines an image sensor image plane through which the scanner head axis extends; and
the method comprises:
forming the nose end of the upper housing to define a scanner head image plane through which the scanner head axis extends; and
tilting each of the image sensor and optics component within the upper housing portion to cause all three of the scanner head image plane, the optics component image plane and the image sensor image plane to intersect along a single line that defines a Scheimpflug intersection.

11. The method of claim 9, comprising:
positioning a lighting cone having a relatively narrow end and a relatively wide end within the upper housing portion with the relatively narrow end adjacent the optics component and the relatively wide end adjacent the nose end of the upper housing portion, wherein:
the lighting cone comprises a conically shaped side wall that extends between and circumferentially about the relatively narrow end and the relatively wide end, and that is configured to diffuse light that passes through the side wall; and
the lighting cone is oriented within the upper housing portion to enable the scanning device FOV to extend through the lighting cone from the optics component adjacent the relatively narrow end and through the nose end of the upper housing portion adjacent the relatively wide end; and
positioning at least one shorter distance light source within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object.

12. The method of claim 11, comprising:
forming the lighting cone to comprises a narrow end wall that closes the relatively narrow end of the lighting cone, and is configured to be optically clear to enable the light reflected from the portion of the surface of the object that falls within the scanning device FOV to pass through the narrow end wall to reach the optics component, wherein:
the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and
selecting at least the degree to which the scanning device optical axis is tilted to cause a shadow region to be shifted away from a center of the scanning device FOV and toward an edge of the scanning device FOV.

13. A scanning device configured to scan an indicia carried on a surface of an object, the scanning device comprising a scanner head that comprises:
an elongate upper housing portion that defines a scanner head axis, and that includes a nose end through which the scanner head axis extends;
an image sensor carried within the upper housing portion, and configured to capture an image of the indicia;
an optics component carried within the upper housing portion between the image sensor and the nose end, and configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor;
a lighting cone through which the light reflected passes from a relatively wide end of the lighting cone adjacent the nose end and to having a relatively narrow end of the lighting cone adjacent the optics component, the lighting cone comprising:
a conically shaped side wall that extends between and circumferentially about the relatively narrow end and the relatively wide end, and that is configured to diffuse light that passes through the side wall; and
a narrow end wall that closes the relatively narrow end, and is configured to be optically clear to enable the reflected light to pass through the narrow end wall to reach the optics component;
at least one shorter distance light source carried within the upper housing portion at a location external to the lighting cone with the side wall interposed between the at least one shorter distance light source and the nose end to cause light emanating from the at least one short distance light source to be made diffuse by the side wall before reaching the surface of the object;
wherein the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and
wherein the scanning device optical axis is tilted relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

14. The scanning device of claim 13, wherein the scanning device optical axis is vertically tilted relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV when a plane of a portion of the surface of the object that falls within the scanning device FOV is oriented to be perpendicular to the scanner head axis.

15. The scanning device of claim 13, wherein:
the nose end of the upper housing defines a scanner head image plane through which the scanner head axis extends;
the optics component defines an optics component image plane through the scanner head axis extends;
the image sensor defines an image sensor image plane through which the scanner head axis extends; and
the image sensor and the optics component are each tilted within the upper housing portion and relative to the scanner head axis to cause all three of the scanner head image plane, the optics component image plane and the image sensor image plane to intersect along a single line that defines a Scheimpflug intersection.

16. The scanning device of claim 15, wherein the optics component is selected from a group consisting of:
a lens;
a liquid lens;
a mechanical iris; and
a mirror.

17. The scanning device of claim 15, wherein the degree to which the scanner head image plane is tilted is selected to cause the shadow region to be shifted away from the center of the scanning device FOV and toward the edge of the scanning device FOV when a plane of a portion of the surface of the object that falls within the scanning device FOV is oriented either to be perpendicular to the scanner head axis or to be parallel with scanner head image plane.

18. The scanning device of claim 15, wherein:
the scanning device comprises an elongate lower housing portion that includes a top end connected to a bottom surface of the upper housing portion, and that extends away from the bottom surface to give the scanning device an overall gun-like physical configuration that tends to encourage an operator to hold the scanning device by gripping the lower housing portion with a hand in a gun-like manner that tends to cause the scanning device to be oriented, while being so held by the operator, to position the upper housing portion above the lower housing portion and the hand, and to cause the scanner head axis to extend horizontally through the upper housing portion and over the lower housing portion and the hand;
with the scanning device so held by the operator, the longer distance light source is carried by the housing at a vertical elevation below the image sensor and the optics component; and
with the scanning device so held by the operator, the tilt of the scanning device optical axis comprises a vertically upward tilt that causes the direction in which the scanning device FOV extends from the optics component to also tilt vertically upward such that an angle between a highest extent of a vertical angle of view of the scanning device FOV and the scanner head axis ($\alpha_{FOV\_TOP}$) is greater than an angle between a lowest extent of a vertical angle of view of the scanning FOV and the scanner head axis ($\alpha_{FOV\_BOTTOM}$).

19. The scanning device of claim 18, wherein:
$\alpha_{FOV\_BOTTOM}$ is derived by the equation:

$$\alpha_{FOV\_BOTTOM} \leq 2(\arctan(h_{light}/2l_{light}));$$

$h_{light}$ comprises a vertical distance between the longer distance light source and an intersection of the optics component image plane and an optics component axis of the optics component; and
$l_{light}$ comprises a horizontal distance between the longer distance light source and the surface of the portion of the object that falls within the scanning device FOV.

20. The scanning device of claim 13, wherein:
the diffusion of the light emanating from the at least one shorter distance light source by the side wall weakens the light emanating from the at least one shorter light source to an extent that prevents effective illumination of the surface of the object by the at least one shorter distance light source to enable a scan of the indicia unless the surface of the object is positioned relatively close to, or in contact with, the nose end;
the scanning device comprises a longer distance light source carried by the upper housing portion, and configured to illuminate the surface of the object effectively enough to enable a scan of the indicia when the surface of the object is positioned at least far enough away from the node end to prevent effective illumination of the surface of the object by the at least one shorter light source; and
the degree to which the scanning device optical axis is tilted is selected to prevent the direct reflection of light emanating from the longer distance light source from being included in the scanning device FOV when the surface of the object is positioned at least far enough away from the nose end to prevent effective illumination of the surface of the object by the at least one shorter light source, and with a plane of a portion of the surface of the object that falls within the scanning device FOV oriented to be perpendicular to the scanner head axis.

21. The scanning device of claim 20, wherein the lighting cone comprises a transparent portion extending outwardly from the circumference of the relatively wide end and into a position within the upper housing portion at which the transparent portion is interposed between the longer distance light source and the nose end to cause light emanating from the longer distance light to pass through the transparent portion to illuminate the surface of the object.

22. A method for improving the scanning of indicia carried on a surface of an object by a scanning device configured to scan the indicia, the method comprising:
forming a housing of the scanning device to comprise an elongate upper housing portion that defines a scanner head axis;
forming the upper housing to include a nose end through which the scanner head axis extends and is configured to be pointed toward the object during the scan of the indicia;
positioning an image sensor configured to capture an image of the indicia within the upper housing portion;
positioning an optics component carried within the upper housing portion between the image sensor and the nose end, wherein the optics component is configured to cooperate with the image sensor to define a scanning device field of view (FOV) that extends from the optics component along a scanning device optical axis through the nose end and toward the surface of the object, and to convey light reflected from a portion of the surface of the object that falls within the scanning device FOV to the image sensor to enable the capture of the image of the indicia when the indicia falls within the scanning device FOV;
positioning a lighting cone having a relatively narrow end and a relatively wide end within the upper housing portion with the relatively narrow end adjacent the optics component and the relatively wide end adjacent the nose end of the upper housing portion, wherein:
the lighting cone comprises a conically shaped side wall that extends between and circumferentially about the relatively narrow end and the relatively wide end, and that is configured to diffuse light that passes through the side wall; and
the lighting cone is oriented within the upper housing portion to enable the scanning device FOV to extend through the lighting cone from the optics component adjacent the relatively narrow end and through the nose end of the upper housing portion adjacent the relatively wide end;
positioning at least one shorter distance light source within the upper housing portion at a location external to the lighting cone with the side wall interposed between the at least one shorter distance light source and the nose end of the upper housing portion to cause light emanating from the at least one short distance light source to be made diffuse by the side wall before reaching the surface of the object, wherein:
the surrounding of the narrow end wall by the side wall, and the diffusion of light emanating from the at least one shorter distance light source by the side wall causes the portion of the surface of the object that falls within scanning device FOV to be unevenly illuminated in a manner that defines a shadow region of lesser illumination on the portion of the surface of the object that falls within the scanning device FOV; and tilting the scanning device optical axis relative to the scanner head axis to cause the scanning device FOV to extend along the scanning device optical axis in a direction that is tilted away from extending in parallel with the scanner head axis to cause the shadow region to be shifted away from a center of the scanning device FOV and toward an edge of the scanning device FOV.

23. The method of claim 22, wherein:

the optics component defines an optics component image plane through the scanner head axis extends;

the image sensor defines an image sensor image plane through which the scanner head axis extends; and the method comprises:

forming the nose end of the upper housing to define a scanner head image plane through which the scanner head axis extends; and tilting each of the image sensor and optics component within the upper housing portion to cause all three of the scanner head image plane, the optics component image plane and the image sensor image plane to intersect along a single line that defines a Scheimpflug intersection.

24. The method of claim 23, comprising selecting the degree to which the scanner head image plane is tilted to cause the shadow region to be shifted away from the center of the scanning device FOV and toward the edge of the scanning device FOV when a plane of a portion of the surface of the object that falls within the scanning device FOV is oriented either to be perpendicular to the scanner head axis or to be parallel with scanner head image plane.

25. The method of claim 22, wherein:

the diffusion of the light emanating from the at least one shorter distance light source by the side wall weakens the light emanating from the at least one shorter light source to an extent that prevents effective illumination of the surface of the object by the at least one shorter distance light source to enable a scan of the indicia unless the surface of the object is positioned relatively close to, or in contact with, the nose end; and the method comprises:

incorporating, into the upper housing portion, a longer distance light source configured to illuminate the surface of the object effectively enough to enable a scan of the indicia when the surface of the object is positioned at least far enough away from the node end to prevent effective illumination of the surface of the object by the at least one shorter light source; and selecting the degree to which the scanning device optical axis is tilted to prevent the direct reflection of light emanating from the longer distance light source from being included in the scanning device FOV when the surface of the object is positioned at least far enough away from the nose end to prevent effective illumination of the surface of the object by the at least one shorter light source, and with a plane of a portion of the surface of the object that falls within the scanning device FOV oriented to be perpendicular to the scanner head axis.

* * * * *